US011095806B2

(12) United States Patent
Ishii

(10) Patent No.: US 11,095,806 B2
(45) Date of Patent: Aug. 17, 2021

(54) DISPLAY CONTROL APPARATUS, DISPLAY CONTROL METHOD, AND IMAGE CAPTURING APPARATUS

(71) Applicant: CANON KABUSHIKI KAISHA, Tokyo (JP)

(72) Inventor: Kazunori Ishii, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/701,842

(22) Filed: Dec. 3, 2019

(65) Prior Publication Data

US 2020/0106951 A1    Apr. 2, 2020

Related U.S. Application Data

(63) Continuation of application No. 15/167,084, filed on May 27, 2016, now abandoned, which is a (Continued)

(30) Foreign Application Priority Data

Apr. 3, 2015 (JP) .................................. 2015-077147
Mar. 4, 2016 (JP) .................................. 2016-042829

(51) Int. Cl.
*H04N 5/232*    (2006.01)
*H04N 5/369*    (2011.01)
(Continued)

(52) U.S. Cl.
CPC ....... *H04N 5/232122* (2018.08); *G03B 13/18* (2013.01); *H04N 5/232939* (2018.08); *H04N 5/36961* (2018.08); *H04N 9/04557* (2018.08)

(58) Field of Classification Search
None
See application file for complete search history.

(56) References Cited

U.S. PATENT DOCUMENTS 6,967,686 B1 * 11/2005 Tanaka ................... G02B 7/102
348/352
8,525,919 B2    9/2013 Ishii
(Continued)

FOREIGN PATENT DOCUMENTS

CN        1848923 A    10/2006
CN      101098407 A    1/2008
(Continued)

OTHER PUBLICATIONS

Office Action for Japanese application serial No. 2016042829 dated Mar. 2, 2020 with English translation.
(Continued)

*Primary Examiner* — Twyler L Haskins
*Assistant Examiner* — Wesley J Chiu
(74) *Attorney, Agent, or Firm* — Carter, DeLuca & Farrell LLP

(57) ABSTRACT

A display control apparatus, comprises: a focus detection unit configured to detect, based on an image signal obtainable from an image sensor, a focus state and reliability of the image signal; and a display control unit configured to display in a display unit, when focus adjustment is performed by a manual operation, an index that indicates the focus state that was detected by the focus detection unit, wherein the display control unit changes a display format of the index according to the reliability.

21 Claims, 14 Drawing Sheets

Related U.S. Application Data continuation of application No. 15/085,247, filed on Mar. 30, 2016, now abandoned.

(51) Int. Cl.
*H04N 9/04* (2006.01)
*G03B 13/18* (2021.01)

(56) References Cited

U.S. PATENT DOCUMENTS

| | | |
|---|---|---|
| 2005/0001924 A1 | 1/2005 | Honda |
| 2008/0278618 A1* | 11/2008 | Matsumoto ...... H04N 5/232935 348/345 |
| 2009/0115883 A1 | 5/2009 | Tsuchiya |
| 2010/0208122 A1 | 8/2010 | Yumiki |
| 2011/0058095 A1* | 3/2011 | Chou ................... G03B 13/00 348/347 |
| 2012/0050604 A1 | 3/2012 | Hamada et al. |
| 2013/0182158 A1* | 7/2013 | Kobayashi ........ H01L 27/14645 348/294 |
| 2014/0198244 A1 | 7/2014 | Hamada |
| 2014/0267869 A1* | 9/2014 | Sawa ............... H04N 5/232939 348/333.03 |
| 2015/0237318 A1 | 8/2015 | Nakashin |
| 2015/0256792 A1* | 9/2015 | Aoki ...................... G03B 13/36 348/226.1 |
| 2016/0198082 A1 | 7/2016 | Choi et al. |

FOREIGN PATENT DOCUMENTS

| | | |
|---|---|---|
| CN | 101802673 A | 8/2010 |
| JP | H11133295 A | 5/1999 |
| JP | 2001083407 A | 3/2001 |
| JP | 2005140943 A | 6/2005 |
| JP | 2007248615 A | 9/2007 |
| JP | 2008134641 A | 6/2008 |
| JP | 2012145840 A | 8/2012 |
| JP | 2014178643 A | 9/2014 |
| JP | 2014215475 A | 11/2014 |

OTHER PUBLICATIONS

Chinese Office Action for application No. 201610206690.5 dated Nov. 30, 2018 with English translation (34 pages).

* cited by examiner

REAR FOCUS   FRONT FOCUS

REAR FOCUS   FRONT FOCUS

| LENS TYPE (LENS ID) | MAXIMUM DISPLAY ANGLE |
|---|---|
| 1104 | 60 DEGREES |
| 1105 | 90 DEGREES |
| 1106 | 120 DEGREES |

DISPLAY CONTROL APPARATUS, DISPLAY CONTROL METHOD, AND IMAGE CAPTURING APPARATUS

CROSS REFERENCE TO RELATED APPLICATIONS

This application is a continuation of U.S. patent application Ser. No. 15/167,084, filed on May 27, 2016, which is a continuation of U.S. patent application Ser. No. 15/085,247, filed on Mar. 30, 2016, which claims the benefit of and priority to Japanese Patent Application Nos. 2015-077147, filed on Apr. 3, 2015, and 2016-042829, filed on Mar. 4, 2016 which are hereby incorporated by reference herein in their entirety.

BACKGROUND OF THE INVENTION

Field of the Invention

The present invention relates to a display control apparatus provided with a configuration that detects a focus state and a configuration that controls display of the focus state, and a display control method, and an image capturing apparatus.

Description of the Related Art

A focus control apparatus of a high definition video camera or the like that is compatible with recent full HD, 4K, or the like has higher resolving power than ever before, and so when a photographer focuses on a subject using a manual focus operation (MF operation), it is not easy to focus exactly. In particular, when performing a focus operation while checking focus using a viewfinder, a display panel, or the like provided in the camera, there are cases where focus offset occurs to a degree that cannot be checked with the viewfinder, the display panel, or the like, and thus it is difficult to judge whether or not an intended focus state has been established.

Consequently, a focus assist method that assists an MF operation has been proposed. Japanese Patent Laid-Open No. 2007-248615 proposes a method in which when performing an MF operation, a focus state evaluation value is calculated, and a degree of focus state is displayed in a bar display. Also, Japanese Patent Laid-Open No. 2005-140943 proposes, as focus assist methods in an image capturing apparatus, a plurality of display methods that indicate changes in focus state accompanying movement of a focusing lens.

On the other hand, Japanese Patent Laid-Open No. 2001-083407 describes an image capturing apparatus utilizing an on-imaging plane phase difference detection method as a method for detecting the focus state, and in this image capturing apparatus a live view mode is considered in which image shooting is performed while displaying a shot image on a rear monitor or the like.

However, in a case where, as in Japanese Patent Laid-Open No. 2001-083407, focus detection is performed using an on-imaging plane phase difference detection method in an image capturing apparatus capable of image display in a live view mode, phase difference is detected on the imaging plane, so detection accuracy decreases according to a blur state of the subject.

For example, when a subject image as shown in FIG. 12A was shot, in a pair of signals used in the phase difference detection method, two peak-like shapes are seen in the vicinity of being in focus, as shown in FIG. 12B. Also, in the vicinity of being in focus, where reference sign 1201 denotes an A image and reference sign 1202 denotes a B image, the A image 1201 and the B image 1202 have about the same shape. Accordingly, by applying the phase difference detection method and calculating the offset amount of these two images, it is possible to calculate a defocus amount with high detection accuracy.

On the other hand, when focus is greatly blurred (large blur), for example, as shown in FIG. 12C, the two mountain-like shapes collapse, becoming one mountain-like shape. Further, that mountain-like shape has a broad base, and the shape differs between the A image 1201 and the B image 1202. Therefore, in a large blur state, the degree of coincidence of the A image and the B image worsens, so detection accuracy decreases.

Detection accuracy also decreases depending on aperture. The reason for this is that, even if distance to the subject is the same, as the aperture changes from a full-open aperture to a small aperture, the offset amount of the A image and the B image decreases and resolving power in phase difference detection becomes more coarse. Also, when there is low illuminance, the S/N ratio decreases, and so the detection accuracy decreases.

As described above, the accuracy of focus detection by an on-imaging plane phase difference detection method differs depending on the image shooting state, so when performing focus assist display, there are cases where it is not possible to display stable information. In addition, there are some cases where a user may feel uncomfortable when performing focus adjustment while monitoring information display due to differences in focus ring operability and in the depth of focus determined by the focal length of an attached lens.

SUMMARY OF THE INVENTION

The present invention has been made in consideration of the above situation, and realizes a focus assist function that is stable when performing manual focus adjustment.

According to the present invention, provided is a display control apparatus, comprising: a focus detection unit configured to detect, based on an image signal obtainable from an image sensor, a focus state and reliability of the image signal; and a display control unit configured to display in a display unit, when focus adjustment is performed by a manual operation, an index that indicates the focus state that was detected by the focus detection unit, wherein the display control unit changes a display format of the index according to the reliability.

Furthermore, according to the present invention, provided is an image capturing apparatus, comprising: an image sensor having a plurality of pixels provided with a plurality of photoelectric converters for a single microlens, the image sensor receiving luminous flux incident through an imaging optical system with the plurality of photoelectric converters and outputting a pair of image signals; and a display control apparatus that comprises: a focus detection unit configured to detect, based on the pair of image signals output from the image sensor, a focus state by performing focus detection using a phase difference method and reliability of the pair of image signals; and a display control unit configured to display in a display unit, when focus adjustment is performed by a manual operation, an index that indicates the focus state that was detected by the focus detection unit, wherein the display control unit changes a display format of the index according to the reliability.

Further, according to the present invention, provided is a display control method, comprising: performing focus detection to detect, based on an image signal obtainable from an image sensor, a focus state and reliability of the image signal; and performing display control to display in a display unit, when focus adjustment is performed by a manual operation, an index that indicates the focus state that was detected in the focus detection, wherein in the display control, a display format of the index is changed according to the reliability.

Further, according to the present invention, provided is a computer-readable storage medium storing a program for causing a computer to execute a display control method, comprising: performing focus detection to detect, based on an image signal obtainable from an image sensor, a focus state and reliability of the image signal; and performing display control to display in a display unit, when focus adjustment is performed by a manual operation, an index that indicates the focus state that was detected in the focus detection, wherein in the display control, a display format of the index is changed according to the reliability.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. Note that the embodiments described below are only one example of means for realizing the present invention, and may be revised or modified as appropriate depending on the configuration of an apparatus where the present invention is to be applied or various conditions, and the present invention is not limited by the below embodiments.

Configuration of Image Capturing System

Figure 1:
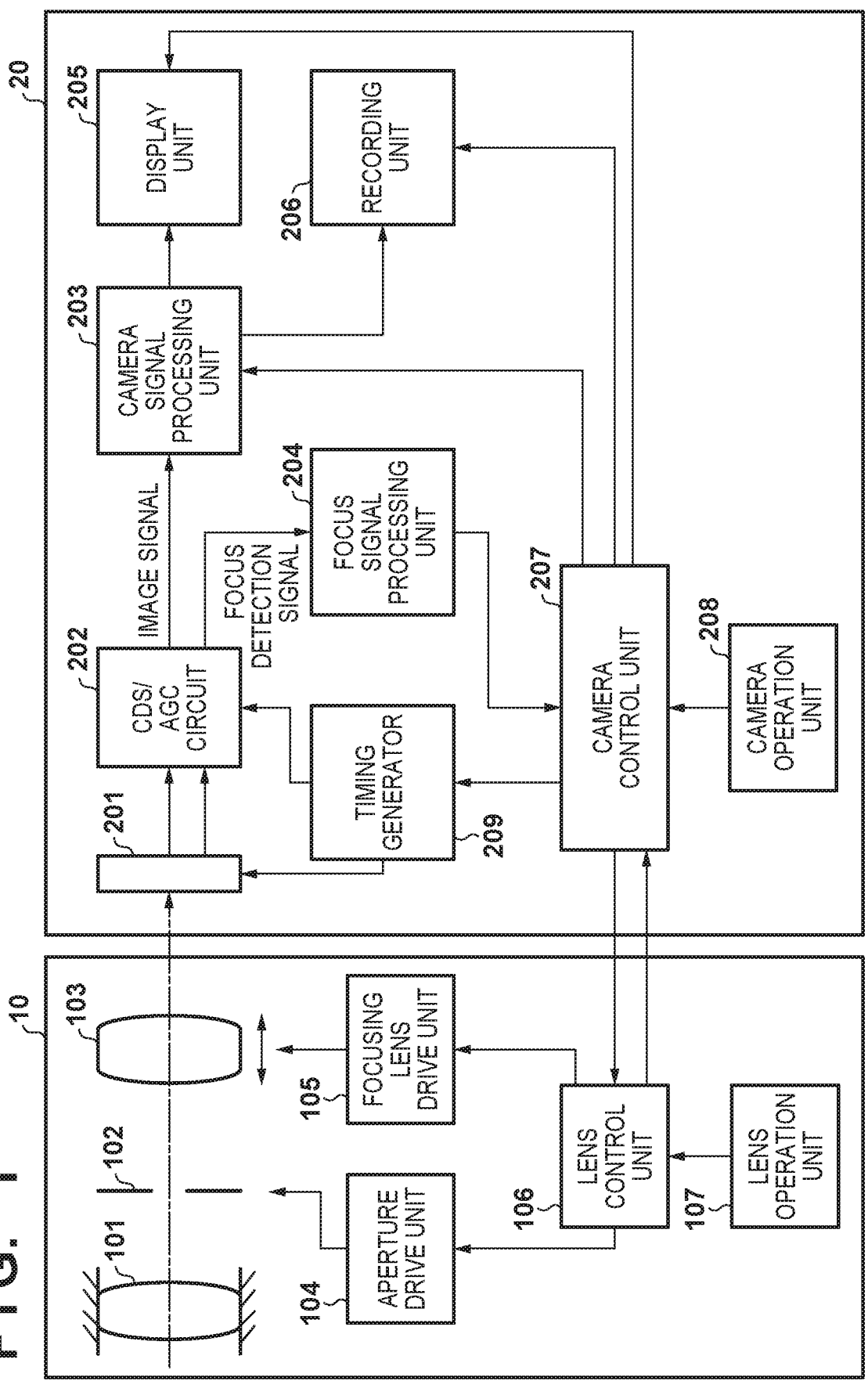
FIG. 1 is a block diagram that shows a schematic configuration of an image capturing system according to an embodiment of the present invention.

FIG. 1 is a block diagram that shows a schematic configuration of an image capturing system provided with a focus assist function according to an embodiment of the present invention. Note that in the present embodiment, an interchangeable lens-type image capturing system is described, but an image capturing apparatus having a fixed lens may also be used.

As shown in FIG. 1, the image capturing system in the present embodiment is configured from a lens unit 10 and a camera main body 20. Also, data communications are performed between a lens control unit 106 that performs unified control of operation of the lens unit 10 as a whole, and a camera control unit 207 that performs unified control of operation of the image capturing system as a whole.

First is a description of the configuration of the lens unit 10. The lens unit 10 has an imaging optical system configured from a fixed lens 101, an aperture 102, a focusing lens 103, a zoom lens (not shown), and the like. The aperture 102 is driven by an aperture drive unit 104, and controls an amount of light incident on an image sensor 201, described later. The focusing lens 103 is driven by a focusing lens drive unit 105, and is used for focus adjustment. An unshown zoom lens is driven by a zoom lens drive unit, and is used for zoom adjustment. Note that in the present embodiment, the zoom lens and the zoom lens drive unit are not essential configurations, and may be omitted.

The aperture drive unit 104, the focusing lens drive unit 105, and the zoom lens drive unit are controlled by the lens control unit 106, and thus an opening diameter of the aperture 102, and positions of the focusing lens 103 and the zoom lens, are controlled. When a user has performed a focus operation, a zoom operation, or the like by operating a focus ring, a zoom ring, or the like provided in a lens operation unit 107, the lens control unit 106 performs control corresponding to the user operation. The lens control unit 106, according to control commands and control information received from the camera control unit 207 described later, performs control of the aperture drive unit 104, the focusing lens drive unit 105, and the zoom lens drive unit, and transmits lens information to the camera control unit 207.

Next is a description of the configuration of the camera main body 20 provided with a focus assist function according to the present embodiment. In the camera main body 20, the image sensor 201 is configured with a CCD or CMOS sensor, where luminous flux that has passed through the imaging optical system of the lens unit 10 is formed as an image on a light-receiving face of the image sensor 201. Also, a subject image that has been formed is photoelectrically converted to an electric charge according to the incident light amount by photodiodes (photoelectric converters) of the image sensor 201, and accumulated. The electric charge that has been accumulated in each photodiode is sequentially read out from the image sensor 201 as a voltage signal corresponding to the electric charge based on a drive pulse conferred from a timing generator 209 according to an instruction of the camera control unit 207. Note that while the detailed configuration of the image sensor 201 will be described later, the image sensor 201 in the present embodiment, other than ordinary image signals, can output a pair of focus detection signals that can be used for focus detection by a phase difference method.

An image signal and a focus detection signal that have been read out from the image sensor 201 are input to a CDS/AGC circuit 202, and correlated double sampling for removing reset noise, gain adjustment, and signal digitization are performed. The CDS/AGC circuit 202 outputs a processed image signal to a camera signal processing unit 203, and outputs a focus detection signal to a focus signal processing unit 204.

The camera signal processing unit 203 performs various image processing on an image signal that has been output from the CDS/AGC circuit 202, and generates a video signal. A display unit 205 is a display device such as an LCD or organic EL display device, and displays an image based on the video signal that was output from the camera signal processing unit 203. Also, when in a recording mode in which an image signal is recorded, the image signal is transmitted from the camera signal processing unit 203 to a recording unit 206, and is recorded to a recording medium such as an optical device, a semiconductor memory, or a magnetic tape.

The focus signal processing unit 204 performs a correlation operation based on a pair of focus detection signals that have been output from the CDS/AGC circuit 202 to detect a focus state. Here, a correlation amount, a defocus amount, and reliability information (degree of coincidence between two images, steepness of two images, contrast information, saturation information, defect information, and the like) are calculated. The calculated defocus amount and reliability information are output to the camera control unit 207. Also, the camera control unit 207, based on the obtained defocus amount and reliability information, notifies the focus signal processing unit 204 of a change in settings used to calculate the defocus amount and reliability information. Note that the details of the correlation operation will be described later with reference to FIGS. 6A to 6D through FIGS. 8A and 8B.

The camera control unit 207 performs control by exchanging information with each configuration within the camera main body 20. In addition to processing within the camera main body 20, the camera control unit 207 controls power ON/OFF, settings changes, and recording according to input from a camera operation unit 208 that was operated by a user. Further, the camera control unit 207 executes various functions corresponding to user operation such as switching between autofocus (AF) control and manual focus (MF) control, checking recorded video, and the like. Also, as described above, the camera control unit 207 exchanges information with the lens control unit 106 within the lens unit 10, transmits control commands and control information of the imaging optical system, and obtains information within the lens unit 10.

Image Sensor Configuration

Figure 2:
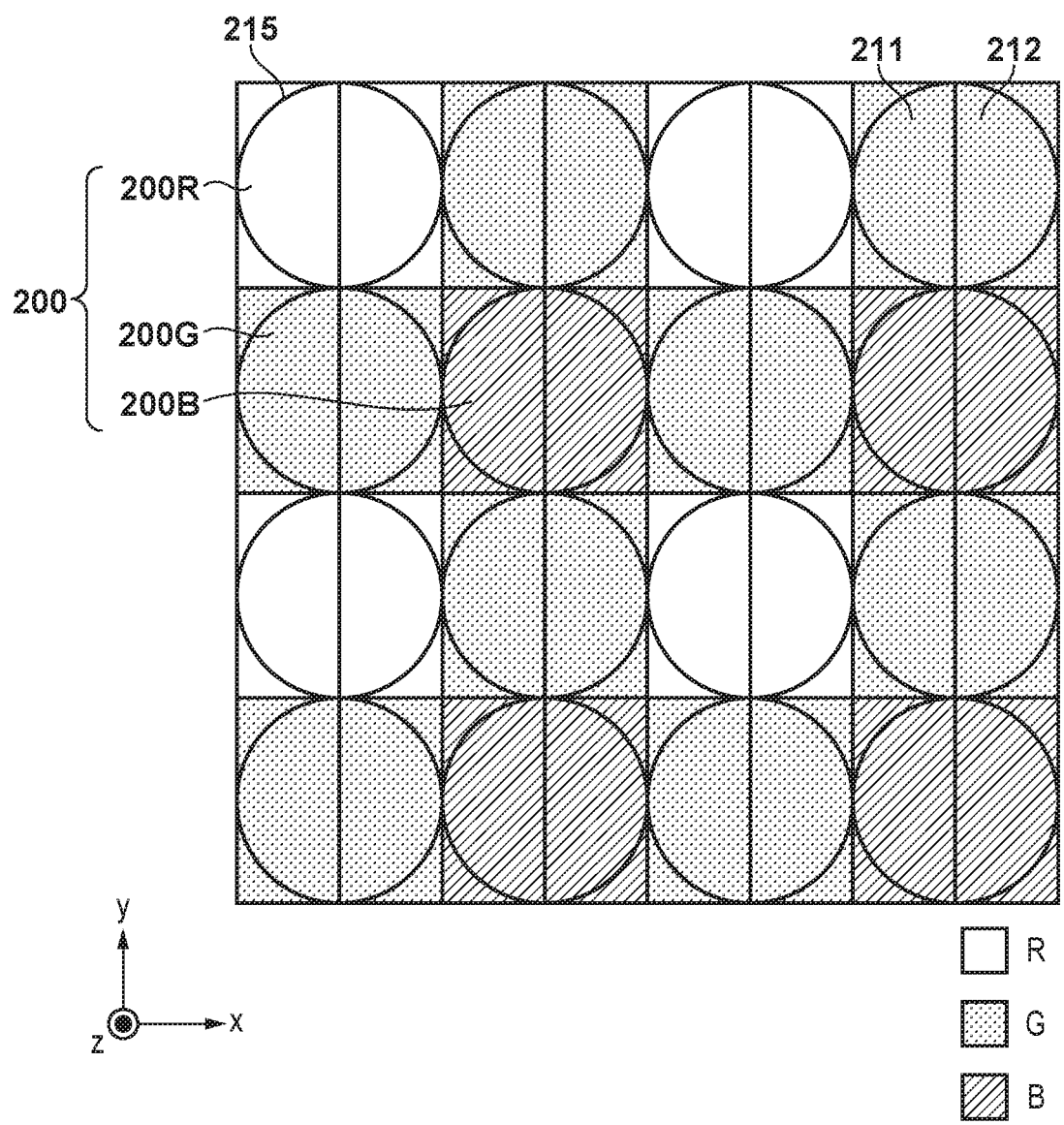
FIG. 2 is a schematic view of a pixel array of an image sensor according to an embodiment.

FIG. 2 shows a schematic view of a pixel array of the image sensor 201 in the present embodiment. In FIG. 2, a pixel array of a two-dimensional CMOS sensor used as the image sensor 201 in the present embodiment is shown in a range of four columns×four rows of image capturing pixels (a range of eight columns×four rows as an array of focus detection pixels).

In the present embodiment, a pixel group 200 includes two columns×two rows of pixels, and is covered by a Bayer array color filter. In each pixel group 200, a pixel 200R having spectral sensitivity to red (R) is positioned at the upper left, pixels 200G having spectral sensitivity to green (G) are positioned at the upper right and the lower left, and a pixel 200B having spectral sensitivity to blue (B) is positioned at the lower right. Further, in the image sensor 201 of the present embodiment, in order to perform focus detection by an on-imaging plane phase difference method, each pixel holds a plurality of photodiodes (photoelectric converters) for one microlens 215. In the present embodiment, each pixel is configured with two photodiodes 211 and 212 arranged in two columns×one row.

By having many pixel groups 200, each including two columns×two rows of pixels (four columns×two rows of photodiodes) shown in FIG. 2, arranged on the imaging plane, the image sensor 201 is enabled to obtain image signals and focus detection signals.

In each pixel having this sort of configuration, luminous flux is split by the microlens 215 and formed as an image on the photodiodes 211 and 212. A signal (A+B signal) obtained by adding signals from the two photodiodes 211 and 212 is used as an image signal, and two signals (A and B image signals) respectively read out from the individual photodiodes 211 and 212 are used as focus detection signals. Note that the image signal and the focus detection signals may be respectively read out, but in the present embodiment, in consideration of processing load, the following sort of configuration may also be adopted. That is, the image signal (A+B signal), and a focus detection signal from either one of the photodiodes 211 and 212 (for example, the A signal), are read out, and by taking the difference between those signals, the other focus detection signal (for example, the B signal) is obtained.

Note that in the present embodiment, a configuration is adopted in which in each pixel, there are the two photodiodes 211 and 212 for the one microlens 215, but the number of photodiodes is not limited to two, and a configuration may also be adopted in which the number of photodiodes is three or more. Also, a configuration may be adopted in which there are a plurality of pixels having a different opening position of a light receiving portion for the microlens 215. That is, a configuration is preferable in which, as a result, two signals used for phase difference detection such that it is possible to detect the phase difference between the A image signal and the B image signal are obtained. Also, the present invention is not limited to a configuration in which, as shown in FIG. 2, all pixels have a plurality of photodiodes; a configuration may also be adopted in which focus detection pixels as shown in FIG. 2 are discretely provided within normal pixels included in the image sensor 201.

First Embodiment

Display Format of Focus Assist

Next is a description of a display format of focus assist in the present embodiment, with reference to FIGS. 3A to 3D. In the present embodiment, the types of focus assist display include four display formats from first to fourth display formats, and focus states that were detected are indicated by display parts 301 to 317.

Figure 3A:
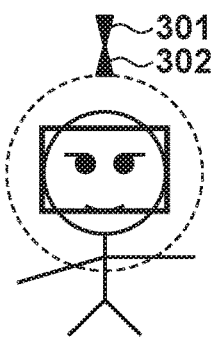
FIGS. 3A to 3D show an example of focus assist display according to a first embodiment.

FIG. 3A shows an example of the first display format, and shows a state in which a subject was determined to be in focus. In a state determined to be in focus, the position of the inward pointing display part 301 coincides with the position of the outward pointing display part 302 (here, stopped at the top). Also, when determined to be in an in-focus state, for example, the display part 301 and the display part 302 may be displayed in a different color (for example, green) than the color in other display formats (for example, white).

Figure 3B:
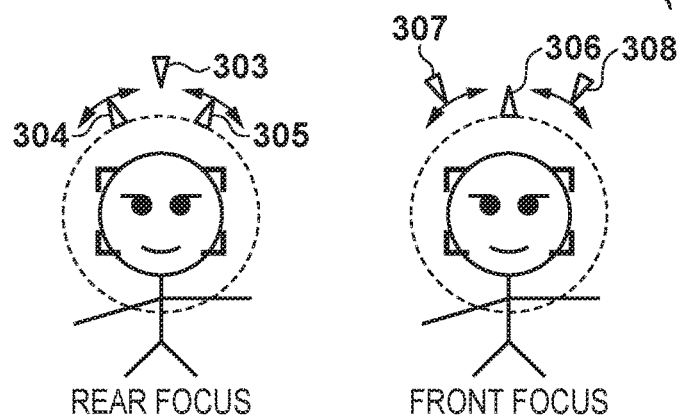

FIG. 3B shows an example of the second display format, in which the subject is not in focus, and in a case where the reliability of focus detection results is high, shows the direction to an in-focus position and the size of a defocus amount. For example, in a case where focus is set to an infinite distance side (rear focus) relative to the subject, in a state with the inward pointing display part 303 stopped at the top, the outward pointing display parts 304 and 305 move with bilateral symmetry on the circumference. The positions of the display part 304 and the display part 305 indicate the size of the defocus amount, and indicate a larger defocus amount the further they are separated from the position of the display part 303 (reference position). Note that the display part 303 corresponds to the display part 301, and a state with the display parts 304 and 305 overlapping each other corresponds to the display part 302.

On the other hand, in a case where focus is set to a near side (front focus) relative to the subject, in a state with the outward pointing display part 306 stopped at the top, the inward pointing display parts 307 and 308 move with bilateral symmetry on the circumference. The positions of the display part 307 and the display part 308 indicate the size of the defocus amount, and indicate a larger defocus amount the further they are separated from the position of the display part 306 (reference position). Note that the display part 306 corresponds to the display part 302, and a state with the display parts 307 and 308 overlapping each other corresponds to the display part 301. As described above, in the second display format, the size of the defocus amount can be indicated by the positions of the display parts that move. Also, the direction to the in-focus position (defocus direction) can be indicated by the direction in which the display part stopped at the top is pointing.

Figure 3C:
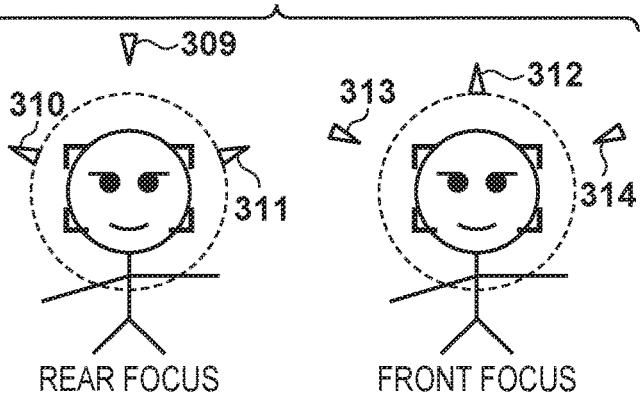

FIG. 3C shows an example of the third display format, in which only the direction to the in-focus position is shown in a case where the reliability of focus detection results is moderate. Here, the display parts 309 to 314 are fixed at predetermined positions regardless of the defocus amount. Also, in the case of rear focus, the inward pointing display part 309 is fixed at the top, and in the case of front focus, the outward pointing display part 312 is fixed at the top. That is, in the third display format, the size of the defocus amount is not indicated, and the direction to the in-focus position is indicated by the direction in which the display part fixed at the top is pointing.

Figure 3D:
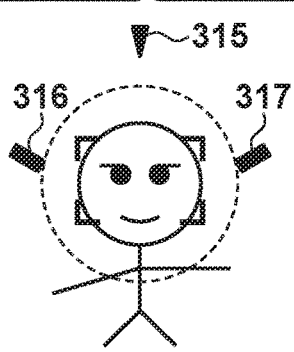

FIG. 3D shows an example of the fourth display format, and shows a case where the reliability of focus detection results is low. In this case, both the size of the defocus amount and the defocus direction are not shown, so a user is allowed to see that focus detection is not possible. Here, the display parts 315 to 317 are displayed in a different color (for example, gray) than the color in other display formats, and the display parts 315 to 317 are fixed at predetermined positions. Also, the shapes of the display part 316 and the display part 317 are made different than the shapes in other display formats.

Note that the focus assist display shown in FIGS. 3A to 3D is only an example, and the present invention is not limited to this display.

Focus Assist Display Control

Figure 4A:
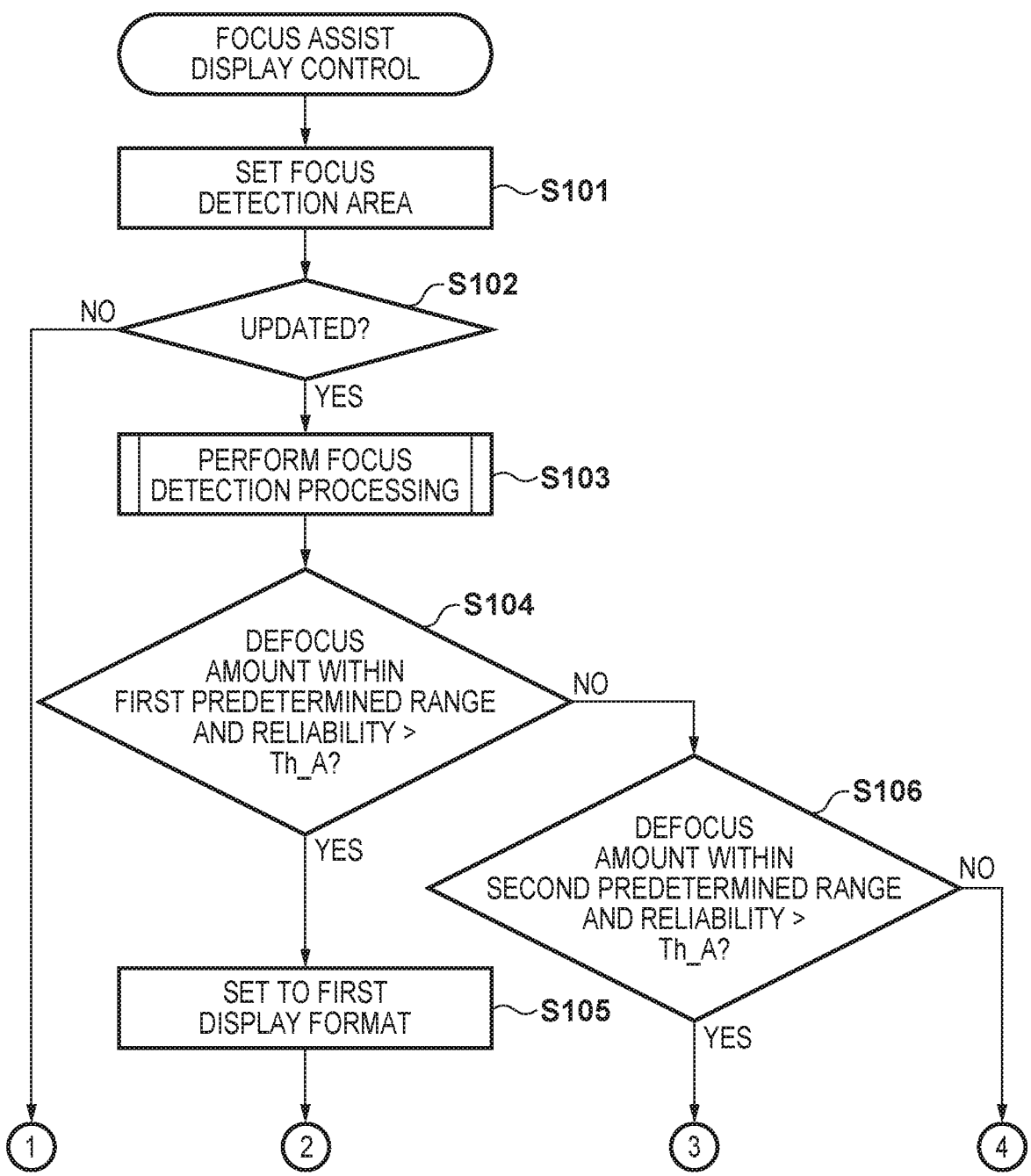
FIGS. 4A and 4B illustrate a flowchart that shows a main flow of focus assist display control according to the first embodiment.
Figure 4B:
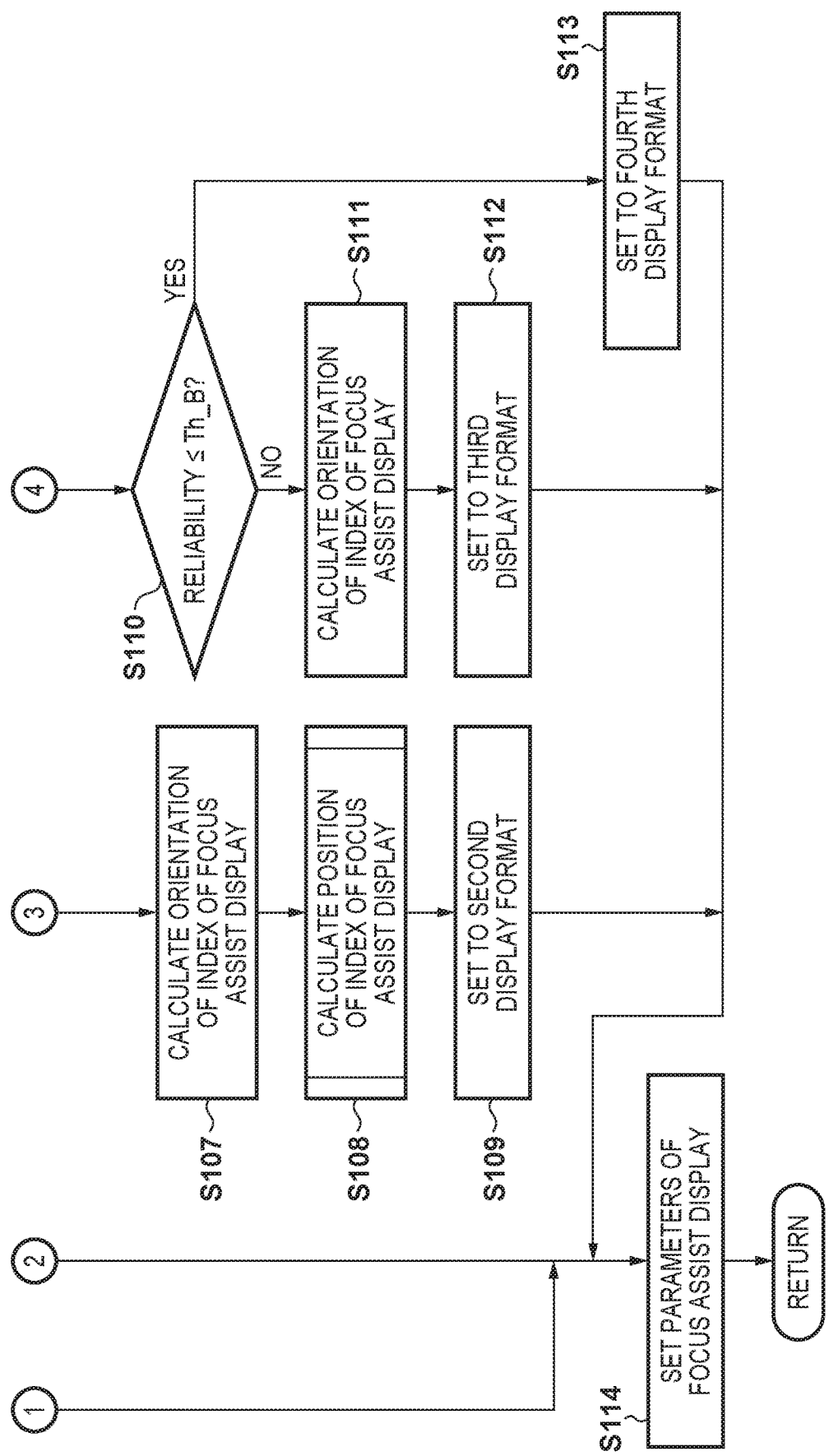

Next is a description of focus assist display control executed by the camera control unit 207. FIGS. 4A and 4B illustrate a flowchart that shows a procedure of main processing of focus assist display control executed by the camera control unit 207. This processing is executed in a predetermined cycle according to a computer program that has been stored in the camera control unit 207. For example, this processing is executed in a cycle of reading out an image signal (each vertical synchronizing period) from the image sensor 201 in order to generate an image of one frame (or one field). This processing may also be repeated a plurality of times within a vertical synchronizing period.

In step S101 a focus detection area is set, and next, the focus signal processing unit 204 confirms whether the focus signal has been updated (step S102). If the focus signal has been updated, focus detection processing is performed in the focus signal processing unit 204 (step S103). Then, as a result of focus detection processing, a defocus amount and reliability are obtained.

Figure 5:
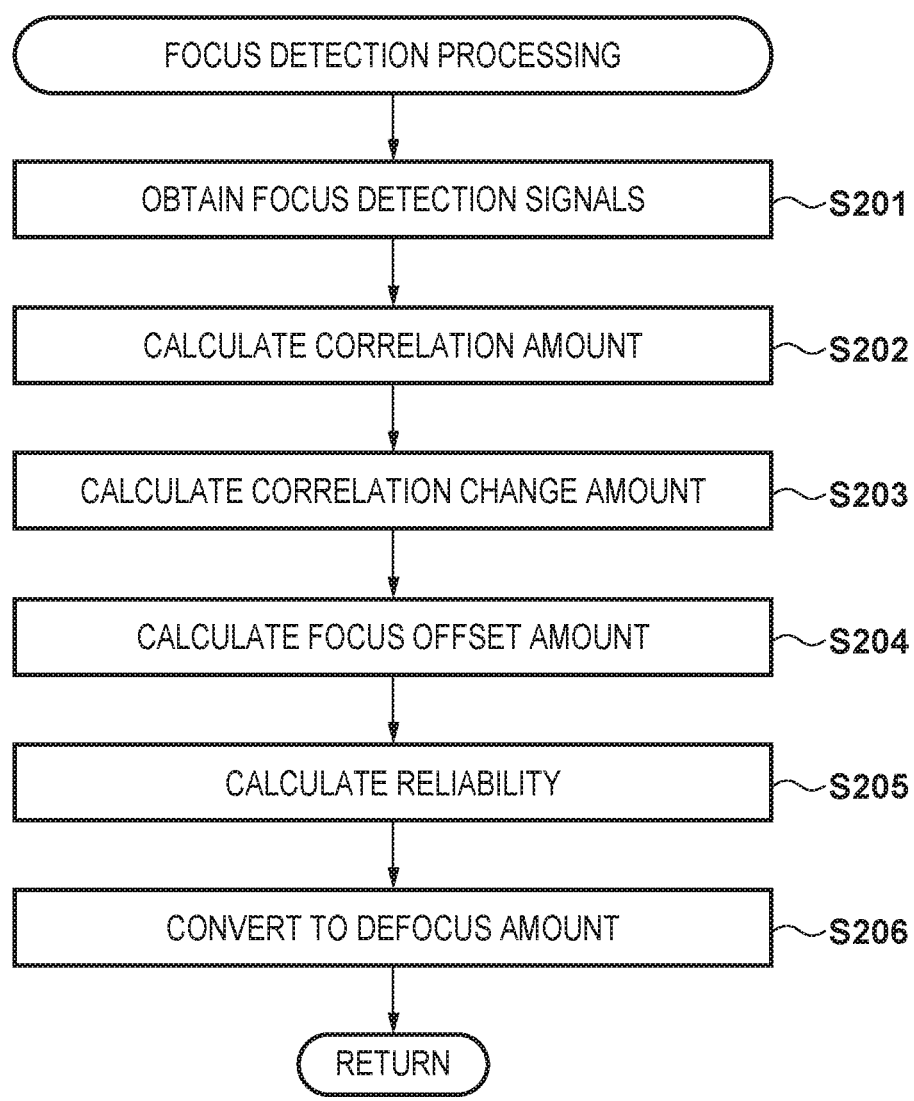
FIG. 5 is a flowchart that shows focus detection processing according to the first embodiment.

Here, the focus detection processing performed in step S103 will be described with reference to FIGS. 5 to 8A and 8B. FIG. 5 is a flowchart that shows focus detection processing, and is performed by the focus signal processing unit 204. First, in step S201, the focus signal processing unit 204 obtains a pair of focus detection signals from the focus detection area that was set in step S101. Next, in step S202, a correlation amount is calculated from the pair of focus detection signals that were obtained in step S201. Next, in step S203, a correlation change amount is calculated from the correlation amount that was calculated in step S202. Then, in step S204, a focus offset amount is calculated from the correlation change amount that was calculated in step S203. Also, in step S205, reliability of the focus detection signals that were obtained in step S201 is calculated. This reliability corresponds to a reliability that expresses the extent to which it is possible to rely on the focus offset amount that was calculated in step S204. Then, in step S206, the focus offset amount is converted to a defocus amount.

Note that the defocus amount may be expressed as an absolute distance from the in-focus position, or as a number of pulses necessary in order to move the focusing lens 103 to the in-focus position, or may be an expression of a different dimension and units as such an expression, or may be a relative expression. That is, it is preferable to express the defocus amount such that it is possible to judge the distance from the in-focus state, or possible to judge how much focus control needs to be performed to move to the in-focus state.

Figure 6A:
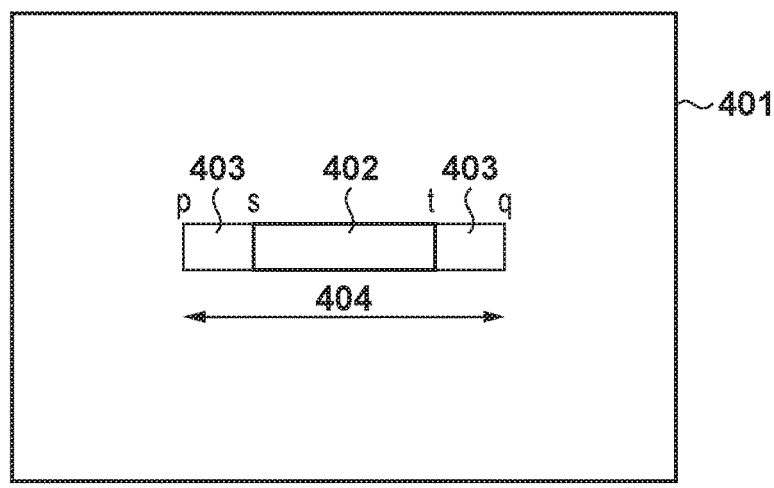
FIGS. 6A to 6D show an example of a focus detection area and image signals obtained from the focus detection area according to the first embodiment.

Next, the focus detection processing described in FIG. 5 will be described in detail with reference to FIGS. 6A to 6D, and FIGS. 7A and 7B. FIG. 6A shows an example of a focus detection area 402 that has been set on a pixel array 401 used to configure the image sensor 201. In an operation area 404, where focus detection signals necessary for performing a correlation operation described later are read out, the focus detection area 402 is combined with shift areas 403 necessary for the correlation operation. In FIG. 6A, reference signs p, q, s, and t respectively indicate coordinates in the x-axis direction, and the operation area 404 corresponds to the range from p to q, and the focus detection area 402 corresponds to the range from s to t.

Figure 6B:
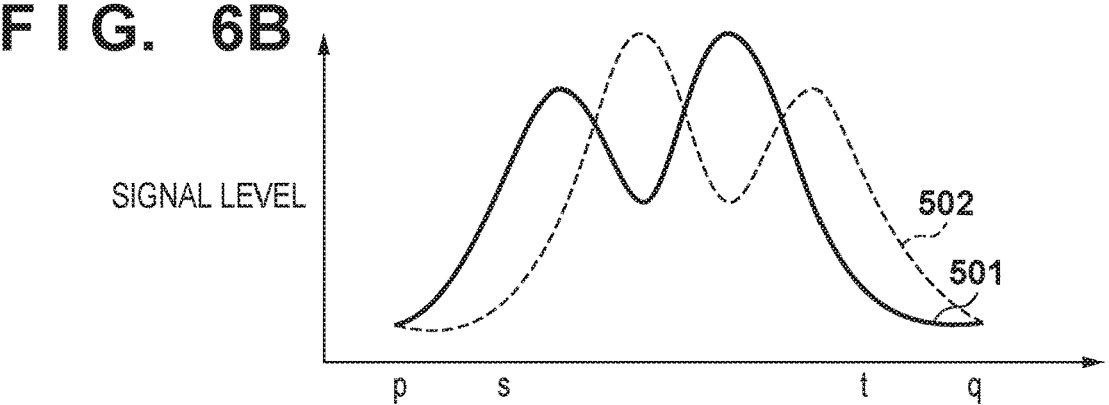
Figure 6C:
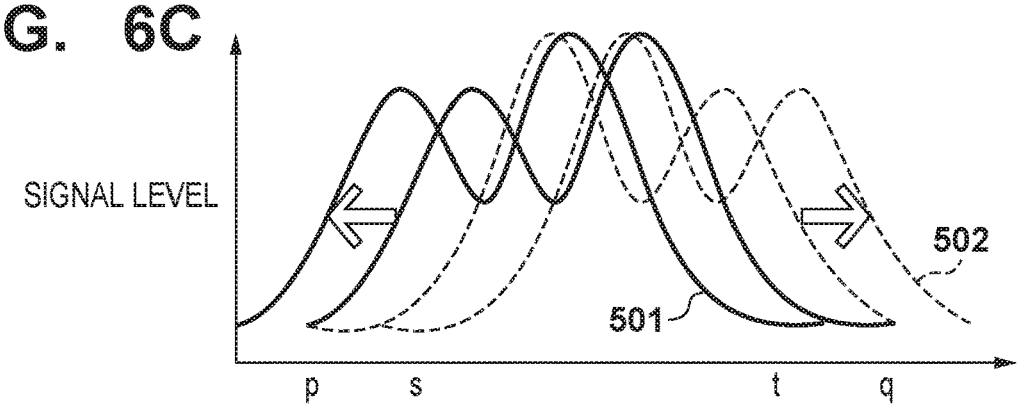
Figure 6D:
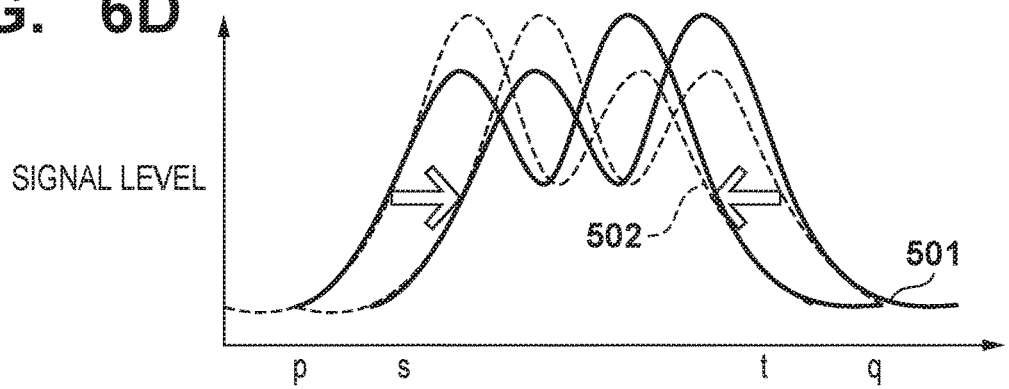

FIGS. 6B to 6D show an example of focus detection signals that were obtained from the operation area 404 that was set in FIG. 6A. The range from s to t corresponds to the focus detection area 402, and the range from p to q corresponds to the operation area 404 necessary for the correlation amount operation, which is based on a shift amount. Solid line 501 indicates an A image signal, and broken line 502 indicates a B image signal.

FIG. 6B shows the A image signal 501 and the B image signal 502 prior to shifting as waveforms. In FIG. 6C, the waveforms of the A image signal 501 and the B image signal 502 are shifted in a plus direction with respect to the positions prior to the shifting shown in FIG. 6B, and in FIG. 6D, the waveforms of the A image signal 501 and the B image signal 502 are shifted in a minus direction with respect to the positions prior to the shifting shown in FIG. 6B. When calculating a correlation amount, the A image signal 501 and the B image signal 502 are shifted bit by bit in the directions of the respective arrows.

Next is a description of a calculation method of a correlation amount COR in step S202. First, as described in FIGS. 6C and 6D, the A image signal 501 and the B image signal 502 are shifted bit by bit, and in each shift state, a sum of absolute values of the difference between the A image signal 501 and the B image signal 502 in the focus detection area 402 that was set is calculated. Here, a minimum number of shifts is represented by p-s, and a maximum number of shifts is represented by q-t. Also, where the shift amount is represented by i, start coordinates of the focus detection area are represented by x, and final coordinates of the focus detection area are represented by y, it is possible to calculate the correlation amount COR with below expression (1).

$$COR[i] = \sum_{k=x}^{y} |A[k+i] - B[k-i]| \quad (1)$$

$$\{(p-s) < i < (q-t)\}$$

Figure 7A:
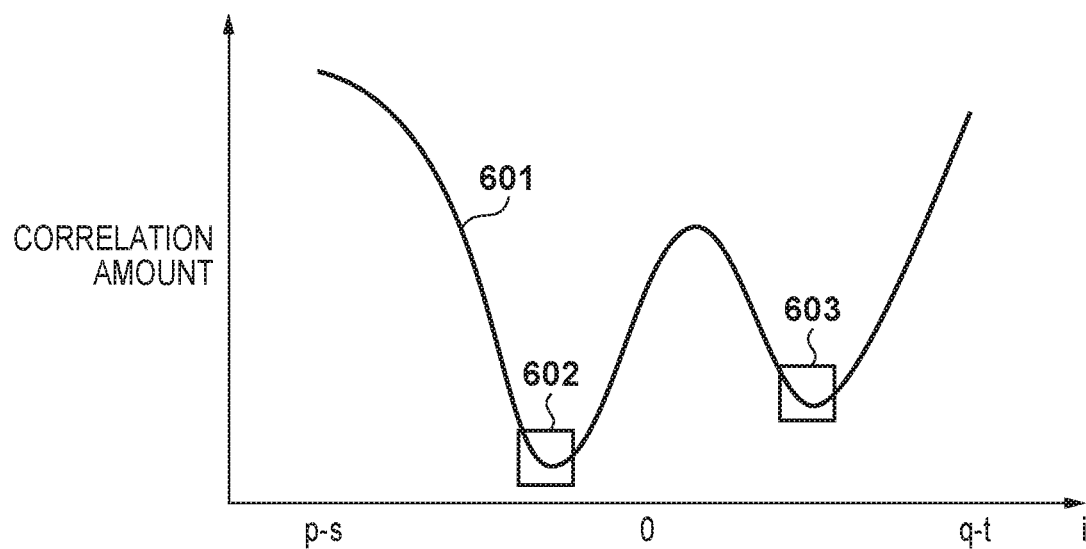
FIGS. 7A and 7B illustrate a correlation operation method according to the first embodiment.

FIG. 7A shows an example of change of the correlation amount, in which the shift amount is shown on the horizontal axis of the graph and the correlation amount is shown on the vertical axis. In a correlation amount waveform 601, reference signs 602 and 603 indicate the vicinity of local minimums. Even within such a vicinity, it can be said that as the correlation amount decreases, the degree of coincidence of the A image signal 501 and the B image signal 502 increases.

Next is a description of a calculation method of a correlation change amount ΔCOR in step S203. First, a correlation change amount is calculated from a difference in correlation amounts when skipping one shift from the correlation amount waveform shown in FIG. 7A. Here, a minimum number of shifts is represented by p-s in FIGS. 7A and 7B, and a maximum number of shifts is represented by q-t in FIGS. 7A and 7B. Where the shift amount is represented by i, it is possible to calculate the correlation change amount ΔCOR with below expression (2).

$$\Delta COR[i] = \Delta COR[i-1] - \Delta COR[i+1] (p-s+1) < i < (q-t-1) \quad (2)$$

Figure 7B:
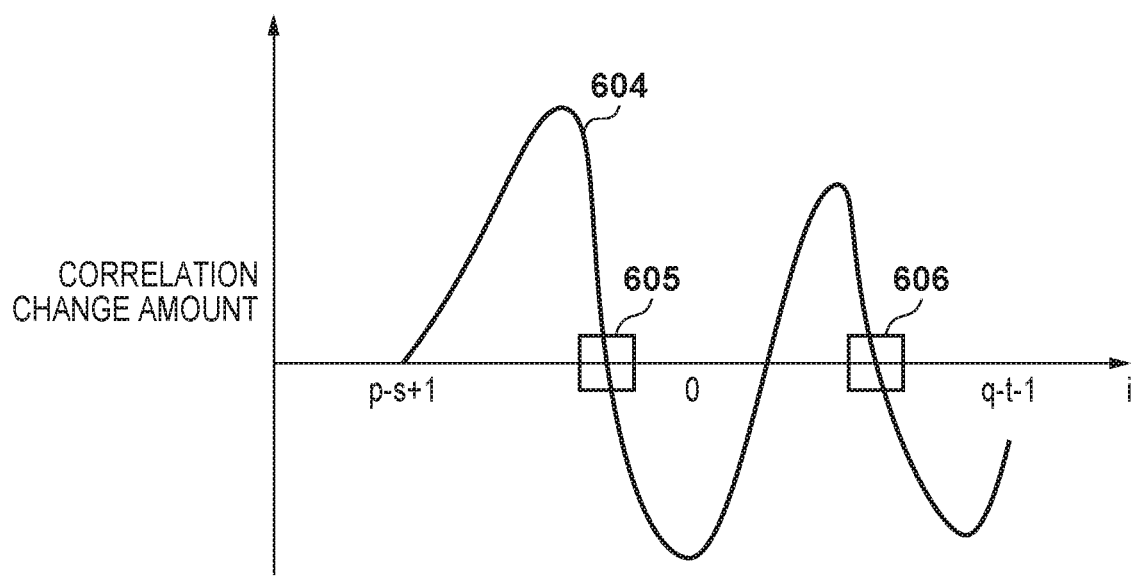

FIG. 7B shows an example of the correlation change amount ΔCOR, in which the shift amount is shown on the horizontal axis of the graph and the correlation change amount is shown on the vertical axis. In a correlation change amount waveform 604, reference signs 605 and 606 indicate the vicinity where the correlation change amount changes from plus to minus. A state where the correlation change amount becomes zero in the portion 605 and the portion 606 is called a zero cross, and in this state the degree of coincidence of the A image signal 501 and the B image signal 502 is largest, and a focus offset amount can be obtained based on the shift amount at that time.

Figure 8A:
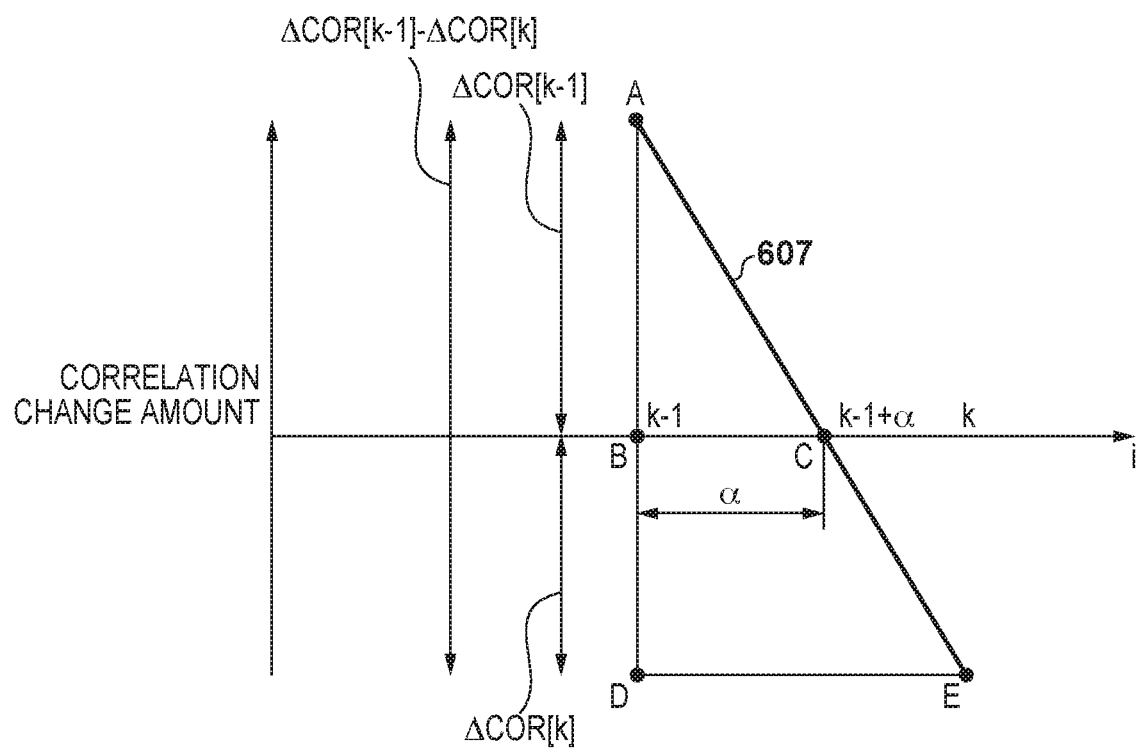
FIGS. 8A and 8B illustrate a correlation operation method according to the first embodiment.

FIG. 8A shows an enlarged view of the portion 605 in FIG. 7B, in which reference sign 607 denotes a portion of the correlation change amount waveform 604. A calculation method of a focus offset amount PRD in step S204 will be described with reference to FIG. 8A. First, the focus offset amount PRD is divided into an integer portion β and a fractional portion α. The fractional portion α can be calculated with below expression (3), from the relationship of triangle ABC and triangle ADE in FIG. 8A.

$$AB:AD = BC:DE \quad (3)$$

$$\Delta COR[k-1]:\Delta COR[k-1] - \Delta COR[k] = \alpha:k - (k-1)$$

$$\alpha = \frac{\Delta COR[k-1]}{\Delta COR[k-1] - \Delta COR[k]}$$

On the other hand, the integer portion β can be calculated with below expression (4), from FIG. 8A.

$$\beta = k - 1 \quad (4)$$

It is possible to calculate the focus offset amount PRD from the sum of α and β that were obtained in the above manner.

Also, in a case where a plurality of zero crosses exist as in FIG. 7B, a location having a larger steepness MAXDER of the change in the correlation amount at the zero cross is used as a first zero cross. This steepness MAXDER is an index that indicates the ease of specifying the in-focus position, and indicates that this is a point where it is easier to specify the in-focus position when the value of the index is larger. The steepness MAXDER can be calculated with below expression (5).

$$MAXDER = |\Delta COR[k-1]| + |\Delta COR[k]| \quad (5)$$

As described above, in a case where a plurality of zero crosses exist, the first zero cross is determined from the steepness at the zero crosses.

Next is a description of the method of calculating reliability of the image signal in step S205. This corresponds to reliability of the defocus amount, but the calculation method described below is only an example, and reliability may also be calculated using another publicly known method. Reliability can be defined using the above-described steepness and a degree of coincidence FNCLVL (referred to below as a 'degree of two image coincidence') between the A image signal and the B image signal. The degree of two image coincidence is an index that indicates accuracy of the focus offset amount, and accuracy is better when the index has a smaller value.

Figure 8B:
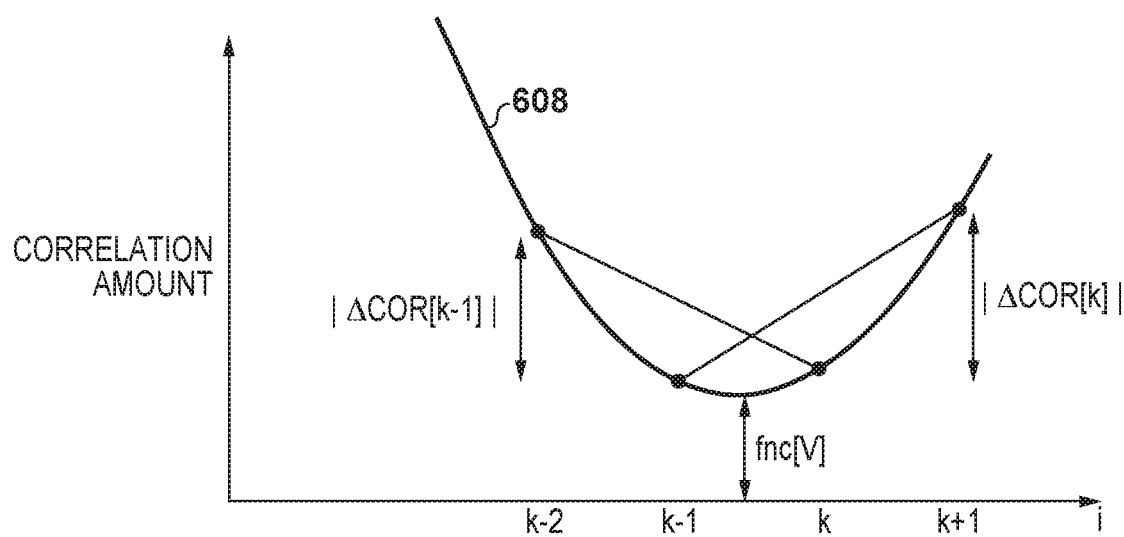

FIG. 8B shows an enlarged view of the portion of local minimum vicinity 602 in FIG. 7A, in which reference sign 608 denotes a portion of the correlation amount waveform 601. The degree of two image coincidence can be calculated with below expression (6).

(i) when ΔCOR[k−1]×2≤MAXDER:

FNCLVL=COR[k−1]+ΔCOR[k−1]/4

(ii) when ΔCOR[k−1]×2>MAXDER:

FNCLVL=COR[k]−ΔCOR[k]/ 4    (6)

When focus detection processing as described above ends in step S103, processing proceeds to step S104. In step S104, whether or not the defocus amount is within a first predetermined range, and reliability is higher than a first threshold value that was determined in advance, are discriminated. When the defocus amount is within the first predetermined range and reliability is higher than a first threshold value Th_A (Yes in step S104), the focus assist display is set to the first display format shown in FIG. 3A (step S105).

The first predetermined range is a range for discriminating whether or not the position of the focusing lens 103 has entered the in-focus range for the subject, and for example, is set based on the depth of focus. Here, the first predetermined range is adopted as the depth of focus. Also, as reliability of the defocus amount, a level such that it is possible to judge that the accuracy of the defocus amount that was calculated is certain is set as the first threshold value Th_A. In a case where the defocus amount reliability is higher than the first threshold value Th_A, for example, contrast of the A image signal and the B image signal is high, and in this state the shapes of the A image signal and the B image signal are similar (degree of two image coincidence is high), or the main subject image is already in focus.

On the other hand, in a case where the defocus amount is outside of the first predetermined range, or reliability is the first threshold value Th_A or less (No in Step S104), processing moves to step S106.

In step S106, whether or not the defocus amount is within a second predetermined range, and reliability is higher than the first threshold value Th_A, are discriminated. When the defocus amount is within the second predetermined range and reliability is higher than the first threshold value Th_A (Yes in step S106), in order to set an index that indicates a direction and amount to an in-focus state in focus assist display, an index orientation is calculated from the defocus direction (step S107). Then, positions for displaying display parts are calculated from a defocus amount as described later (step S108). Here, the display parts whose display positions are calculated are the display parts that move in the second display format described in FIG. 3B. Then, focus assist display is set to the second display format shown in FIG. 3B (step S109). On the other hand, in a case where the defocus amount is outside of the second predetermined range, or reliability is the first threshold value Th_A or less (No in Step S106), processing moves to step S110.

Note that in the second predetermined range, a defocus amount is set that can be detected without reliance on the subject. This is because, for example, it is conceivable that the detectable defocus amount differs between a high contrast subject and a low contrast subject. In such a case, the state that can be displayed in the second display format differs depending on the subject, so the user feels uneasy. Therefore, by setting the second predetermined range, an amount is set whereby a defocus amount can generally be obtained regardless of the subject. For example, in the present embodiment the defocus amount is set to 2 mm. However, the manner of setting the defocus amount is not limited to this, and differs also depending on the shift amount when obtaining a focus offset amount. It is not necessary to set the shift amount in a case where it is not possible to detect a defocus amount that exceeds 2 mm, and in that case the second predetermined range may be infinitely large.

Also, the defocus amount may be determined in consideration of operability of the focus assist display. In the second display format, the display parts that move indicate how much the present state is offset from an in-focus state. Therefore, when performing display to a position far from the display part fixed at the top, it is difficult for the user to know how far the present position is from the in-focus position. Also, depending on the display method, when the size of focus assist display on a screen also becomes large, the screen becomes difficult to view, so the defocus amount may be determined in consideration of these matters.

In step S110, whether or not reliability is the second threshold value Th_B or less is discriminated. When reliability is not the second threshold value Th_B or less (No in Step S110), an orientation of the index of focus assist display is calculated from the defocus direction (step S111), and focus assist display is set to the third display format shown in FIG. 3C (step S112).

Thus, in a case where reliability is the first threshold value Th_A or less (threshold value or less), and is higher than the second threshold value Th_B (reliability is moderate), it is determined that the defocus direction indicating the direction that the in-focus position is expected to exist is certain. Note that a case where reliability of the defocus amount is the first threshold value Th_A or less, and is higher than the second threshold value Th_B, is the following sort of state. That is, although the degree of two image coincidence level calculated with the focus signal processing unit 204 is less than a predetermined value, there is a definite tendency for the correlation amount obtained by relatively shifting the A image signal and the B image signal, so it is possible to rely on the defocus direction. For example, the above determination is often made when there is a small amount of blur of the main subject.

On the other hand, in a case where reliability is the second threshold value Th_B or less (Yes in step S110), it is determined that it is not possible to rely on the defocus amount and the defocus direction. Then, focus assist display is set to the fourth display format shown in FIG. 3D (step S113). A case where reliability is the second threshold value Th_B or less, for example, is state in which the A image signal and the B image signal have low contrast, and the degree of two image coincidence is also low. This state often occurs when the subject is greatly blurred, and so calculation of a defocus amount is difficult.

In step S114, based on any of the first through fourth display formats that were set by the above processing, parameters necessary for focus assist display such as color information of focus assist display, and index orientation and position, are set, and notice of these parameters is given to the display unit 205.

Next is a description of the method for calculating positions of display parts of focus assist display in step S108 in FIG. 4B, with reference to FIGS. 9A to 9D. In FIGS. 9A to 9D, defocus amount is shown on the horizontal axis, and display part positions (index position) are shown on the vertical axis. Note that here the index position indicates, as an angle, a movement amount of the display parts that move (display parts 304, 305, 307, and 308), with respect to the position of the display part that is fixed at the top in the second display format described in FIG. 3B.

Figure 9A:
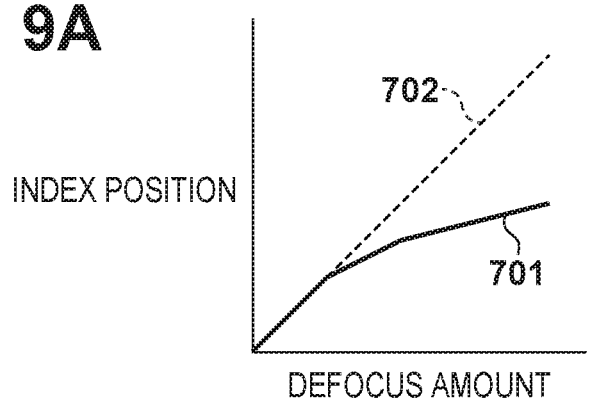
FIGS. 9A to 9D show a relationship between a defocus amount and a display position of an index in focus assist display according to the first embodiment.

If the detection accuracy is constant regardless of the defocus amount that was detected, when the defocus amount and the index position are expressed linearly as indicated by dotted line 702 in FIG. 9A, an operating amount of a focus ring, for example, matches to the display positions of display parts, and thus a focus operation is easy to perform. However, in the case of an on-imaging plane phase difference detection method, as described above, detection accuracy decreases as the defocus amount increases. Therefore, in a case where a display part was displayed at a position corresponding linearly to the defocus amount that was output, it is conceivable that the relationship between the actual focus state and the display part position will vary due to the decrease in detection accuracy. In this case, the user sometimes feels discomfort, and operability worsens.

Therefore, in the first embodiment, a configuration is adopted in which, as indicated by solid line 701 in FIG. 9A, movement of the display part position is made less sharp as the defocus amount increases. That is, the change in position (conversion amount) of the display part relative to the defocus amount is reduced as the defocus amount increases. In other words, as the defocus amount increases, the defocus amount that corresponds to the position change per unit angle (unit movement amount) of the display part is increased. For example, in the case of focus assist display as indicated by the solid line 701, when the display part position is indicated as an angle, a defocus amount of 0.02 mm per one degree is indicated up to a defocus amount of 0.5 mm. Also, a defocus amount of 0.04 mm per one degree is indicated up to a defocus amount of 1 mm, and a defocus amount of 0.08 mm per one degree is indicated up to a defocus amount of 2 mm. Also, when one degree is indicated based on the depth of focus, one degree is indicated as the depth of focus up to a defocus amount of 0.5 mm, two times the depth of focus per one degree is indicated up to a defocus amount of 1 mm, and four times the depth of focus per one degree is indicated up to a defocus amount of 2 mm. By controlling the index position in this way, it is possible to realize stable focus assist display regardless of the defocus amount.

Figure 9B:
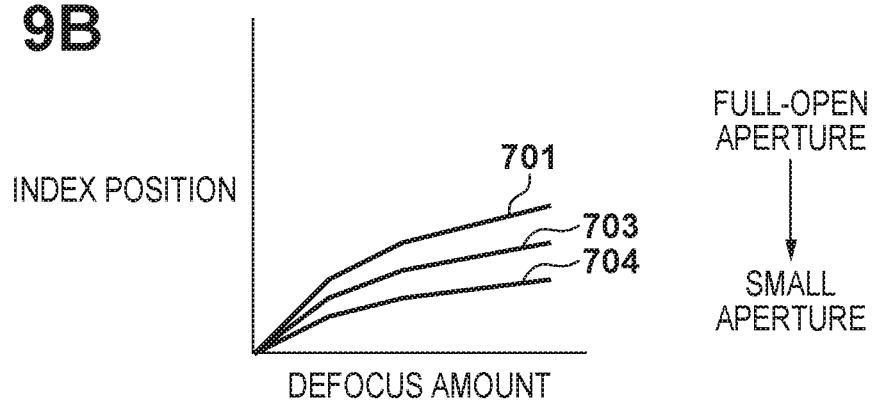

Next, FIG. 9B illustrates control of the index position according to aperture. As described above, in the case of an on-imaging plane phase difference detection method, as the aperture changes from a full-open aperture to a small aperture, the focus offset amount of the A image signal and the B image signal differs even in cases where a certain subject was shot at the same distance to the subject. The focus offset amount is largest and the detection accuracy is highest in the case of a full-open aperture. Therefore, in a case where a defocus amount that has been detected was converted as-is to an index, it is conceivable that the relationship between the actual focus state and the display part position will vary more with a smaller aperture. Therefore, as indicated by lines 701, 703, and 705 in FIG. 9B, movement of the display part position is changed according to the aperture. That is, the change in position (conversion amount) of the display part relative to the defocus amount is reduced as the aperture changes from a full-open aperture to a small aperture. For example, conversion is performed such that the defocus amount per one degree doubles when the aperture is F5.6 relative to when the aperture is F2.8. Thus, it is possible to realize stable focus assist display regardless of the aperture.

Figure 9C:
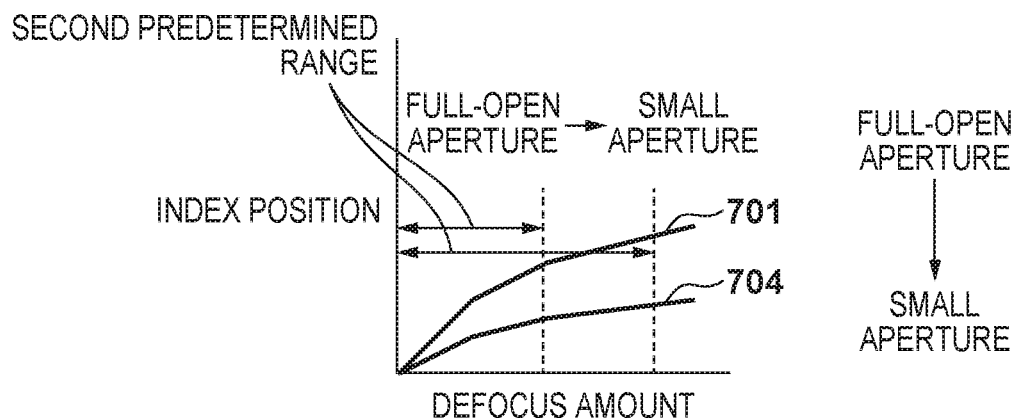

Further, because the depth of focus deepens as the aperture changes from a full-open aperture to a small aperture, the subject becomes less likely to blur in comparison to a case where the aperture is on the full-open aperture side. In this case, it is conceivable that on the small aperture side, there is less influence of image collapse in a case where the focusing lens was moved from the in-focus position, and so detection is possible up to a large defocus amount. Therefore, as shown in FIG. 9C, the second predetermined range used in the determination in step S106 in FIG. 4A is widened on the small aperture side indicated by line 704 in comparison to a case of the full-open aperture side indicated by line 701. By adopting such a configuration, the display part movement in focus assist display changes less between the full-open aperture side and the small aperture side for a given image blur. Thus, the display part movement in focus assist display is stabilized for the video image viewed by the user, and operability improves.

Figure 9D:
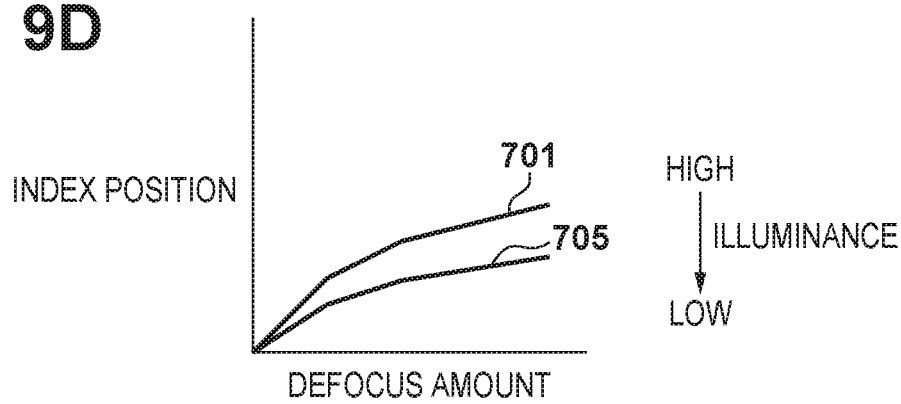

FIG. 9D illustrates a state of low illuminance and a state of a non-low illuminance. As described above, in a state of low illuminance, the signal levels of the A image signal and the B image signal decrease. Also, due to increasing ISO sensitivity a noise component increases and the S/N ratio decreases, so detection accuracy also decreases. In this case as well, it is conceivable that the relationship between the actual focus state and the display part position will vary. Therefore, in a state of low illuminance, as indicated by line 705, the change in the display part position for a given defocus amount is reduced. For example, line 705 indicates that the defocus amount per one degree is doubled in a state of low illuminance relative to a state of non-low illuminance.

In the first embodiment, for example, whether low illuminance or not is determined using the below four determination methods. In the first determination method, it is determined whether or not ISO sensitivity has been set to a predetermined value or more. When ISO sensitivity is a predetermined value or more, it is determined that low illuminance shooting is being performed, and when ISO sensitivity is less than the predetermined value, it is determined that low illuminance shooting is not being performed. In the second determination method, it is determined whether or not a peak value of luminance of a video signal is a predetermined value or more. When the peak value of luminance of the video signal is the predetermined value or more, it is determined that low illuminance shooting is not being performed, and when the peak value of luminance of the video signal is less than the predetermined value, it is determined that low illuminance shooting is being performed. In the third determination method, it is determined whether or not an exposure value is a predetermined value or less. When the exposure value is the predetermined value or less, it is determined that low illuminance shooting is being performed, and when the exposure value is more than the predetermined value, it is determined that low illuminance shooting is not being performed. In the fourth determination method, it is determined whether or not a gain setting is a predetermined value or more. When the gain setting value is the predetermined value or more, it is determined that low illuminance shooting is being performed, and when the gain setting value is less than the predetermined value, it is determined that low illuminance shooting is not being performed.

Note that calculation of the display part position in focus assist display according to the above-described states of defocus amount, aperture, low illuminance, and the like may be implemented by any method, or may be implemented by combining a plurality of methods.

By thus changing movement properties of the index in focus assist display according to the defocus amount, aperture, and illuminance, it is possible to realize stable focus assist display, and improve user operability.

Note that it is conceivable that if the display part position that was calculated as described above is displayed as-is in the display unit 205 each time a position is calculated, it will not be possible to realize smooth index movement, and so the display will appear crude. Therefore, an average value of index positions (or movement amounts from the reference position) that were calculated a plurality of times is calculated, and notice of that result is given. The number of past index positions used to calculate this average value may be changed according to the image shooting state, such as the above-described defocus amount, aperture, low illuminance, and the like. For example, an average value of the past two index positions is used up to a defocus amount of 1 mm, and an average value of the past three index positions is used up to a defocus amount of 2 mm. Also, for example, an average value of a double number of index positions is used on the small aperture side of F11 compared to an aperture between a full-open aperture and F11. For example, in a state of low illuminance, an average value of a double number of index positions is used compared to a state of non-low illuminance.

Also, in order to stably express the index of focus assist display, it is conceivable to average the defocus amount used for calculation of the index position with past defocus amounts, and use that average value. Thus, it is possible to suppress variation in the defocus amount. By changing the number of these past defocus amounts to be averaged according to the image shooting state, such as the above-described defocus amount, aperture, low illuminance, and the like, it is possible to perform even more stable focus assist display.

For example, an average value of the past two defocus amounts is used up to a defocus amount of 1 mm, and an average value of the past three defocus amounts is used up to a defocus amount of 2 mm. Also, for example, an average value of a double number of defocus amounts is used on the small aperture side of F11 compared to an aperture between a full-open aperture and F11. For example, in a state of low illuminance, an average value of a double number of defocus amounts is used compared to a state of non-low illuminance.

According to the first embodiment as described above, in an image shooting apparatus having a focus assist function when performing manual focus control, a defocus amount and defocus direction within a focus detection range, and reliability, are detected by performing focus detection processing of an on-imaging plane phase difference detection method. By changing focus assist display that indicates the defocus amount and defocus direction according to reliability, a stable function is realized, and it is possible to improve operability. When doing so, by changing display properties of an index of focus assist display that indicates a movement amount from a current focusing lens position to an in-focus position according to the defocus amount and image shooting state, a stable index display is realized, and thus it is possible to reduce user discomfort.

Second Embodiment

Next is a description of the second embodiment of the present invention. Note that in display control of focus assist display in the second embodiment, processing to calculate an index position in focus assist display in step S108 in FIG. 4B differs from the first embodiment. Accordingly, below, differing points will be described, but a description of configurations of the image capturing apparatus and display control that are the same as in the first embodiment will be omitted here.

Figure 10A:
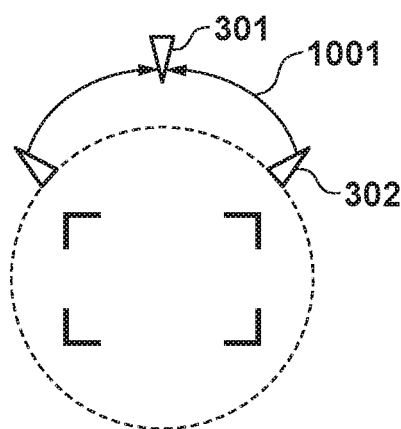
FIGS. 10A and 10B show a relationship between a focus ring operation and an index of focus assist display according to a second embodiment.
Figure 10B:
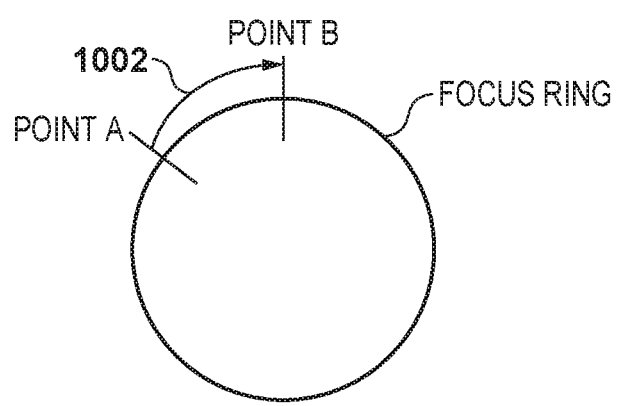

Operability is better for a user if movement of display parts in focus assist display changes linearly relative to movement of a focus ring. For example, it is preferable that a movement amount 1001 of a display part in focus assist display in FIG. 10A is the same as a movement amount 1002 from point A to point B of a focus ring in FIG. 10B, where point B is the in-focus position. However, in the case of an interchangeable lens-type image capturing apparatus, ring operability of the focus ring differs depending on the attached lens, so operation linked to movement of the display part of focus assist display is difficult. Consequently, in this second embodiment, lens information is communicated from the lens control unit 106 to the camera control unit 207, and based on the lens information, a conversion amount of the defocus amount per one unit (one degree) of display position of the display part is set.

A first method is to determine the conversion amount depending on lens type. For each lens type, whether or not a rotation angle of the focus ring is large is stored in advance in the camera main body 20, and the type of the attached lens unit 10 is transmitted from the lens control unit 106 to the camera control unit 207. Then, the conversion amount for converting from the defocus amount to the display position of the display part is changed according to the lens type that was obtained.

Figures 11A, 11B:
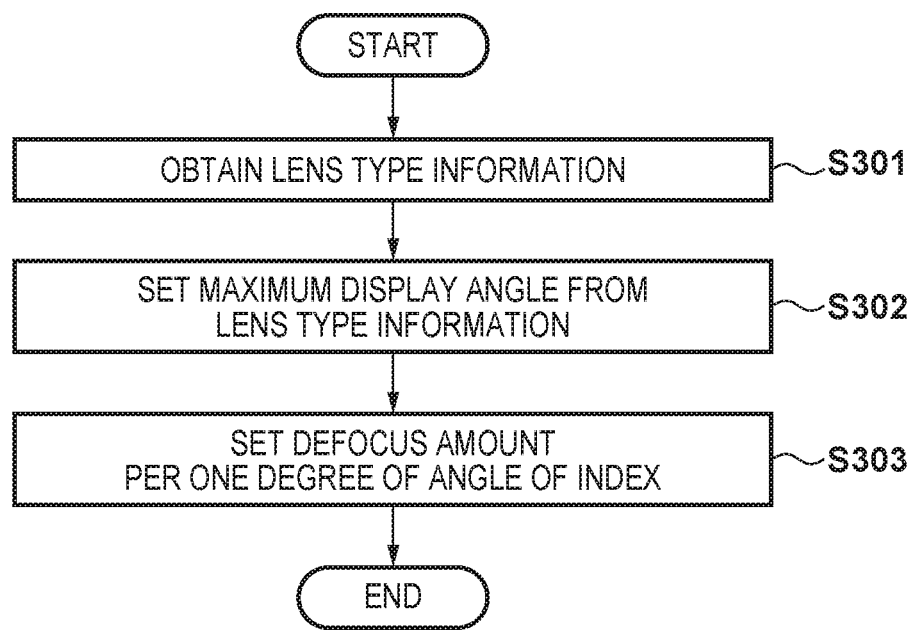
FIGS. 11A to 11C are flowcharts and a table that show processing to set an amount of conversion from a defocus amount to an index position in the second embodiment.

FIG. 11A is a flowchart of conversion amount setting processing in the first method, and FIG. 11B shows an example of a chart of maximum display angles (maximum movement amounts) for lens types (lens IDs). First, in step S301, lens type information is obtained from the lens unit 10 that has been attached. In step S302, a maximum display angle that is stored in advance in the camera main body 20 is set from the lens type information. In step S303, a defocus amount per one degree of angle is set from the maximum display angle. For example, in a case where a lens has been attached that has a lens ID of 1104 in the chart in FIG. 11B, the maximum display angle is discriminated to be 60 degrees. Then a defocus amount per one degree when the defocus amount set in the second predetermined range is expressed with the maximum display angle is calculated. When the second predetermined range has a defocus amount of 2 mm, the defocus amount per one degree is about 0.033 mm. This is similarly true in a case where the second predetermined range is based on focus depth.

Figure 11C:
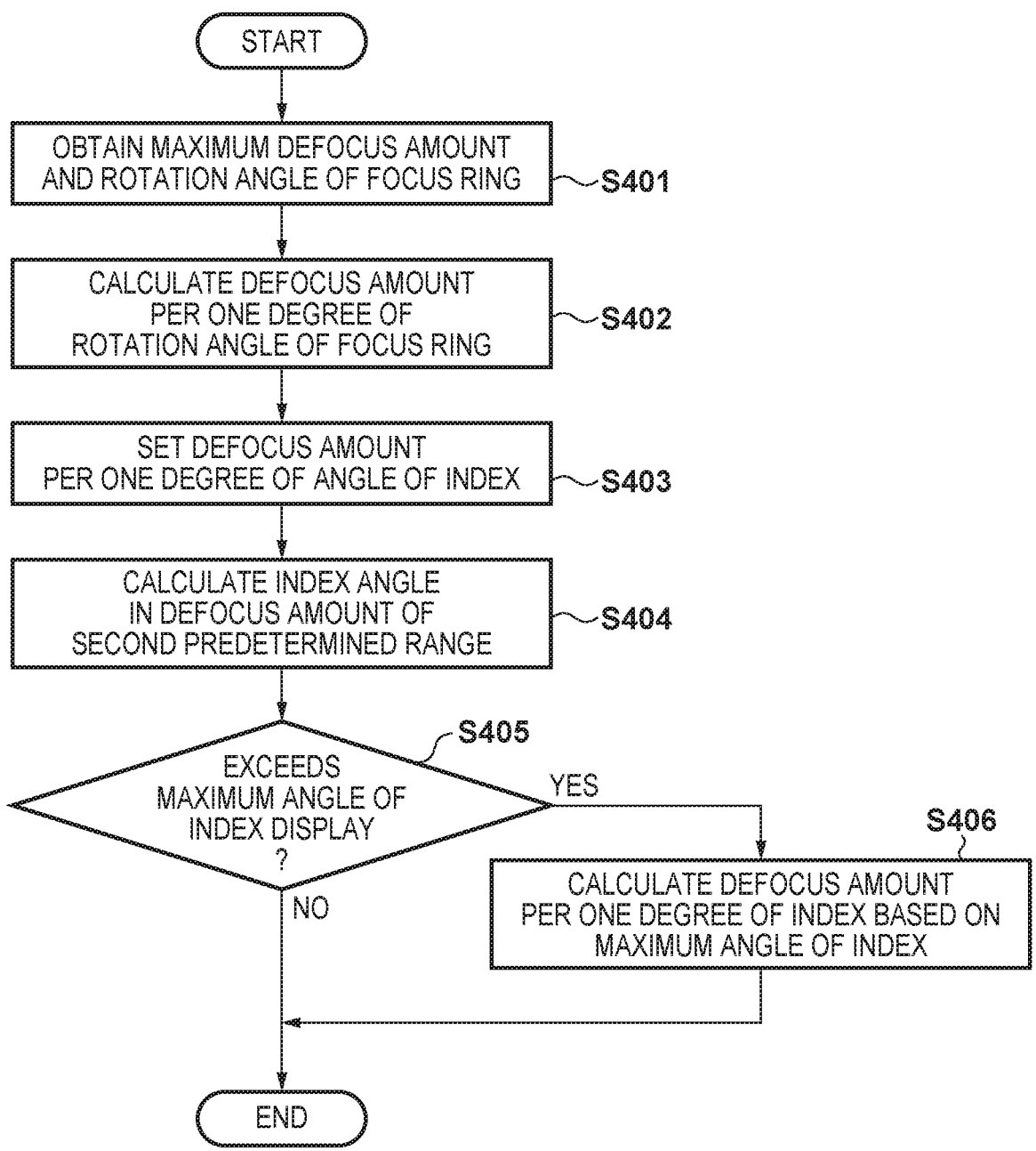
Figure 12A:
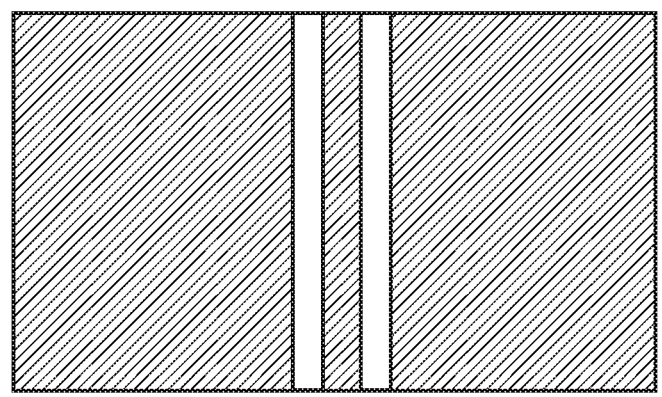
FIGS. 12A to 12C show an example of image signals obtained in an on-imaging plane phase difference detection method.
Figure 12B:
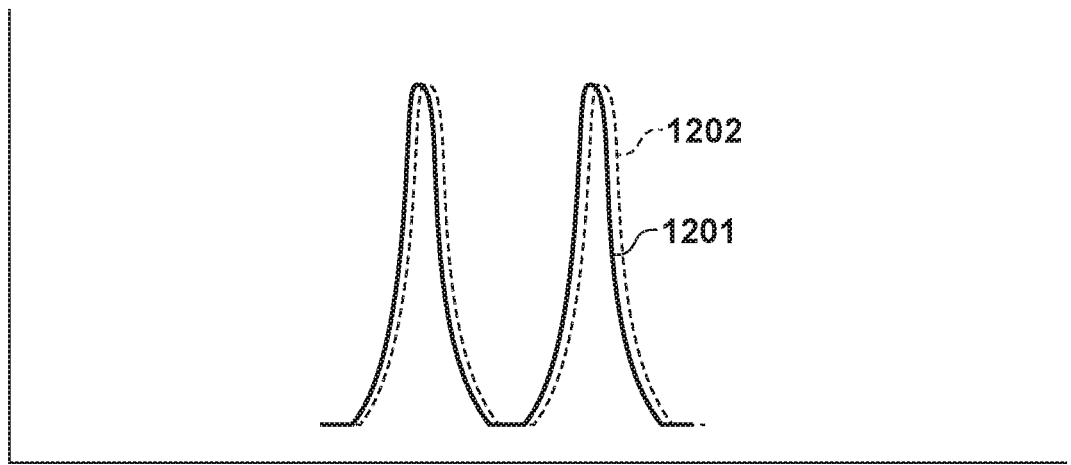
Figure 12C:
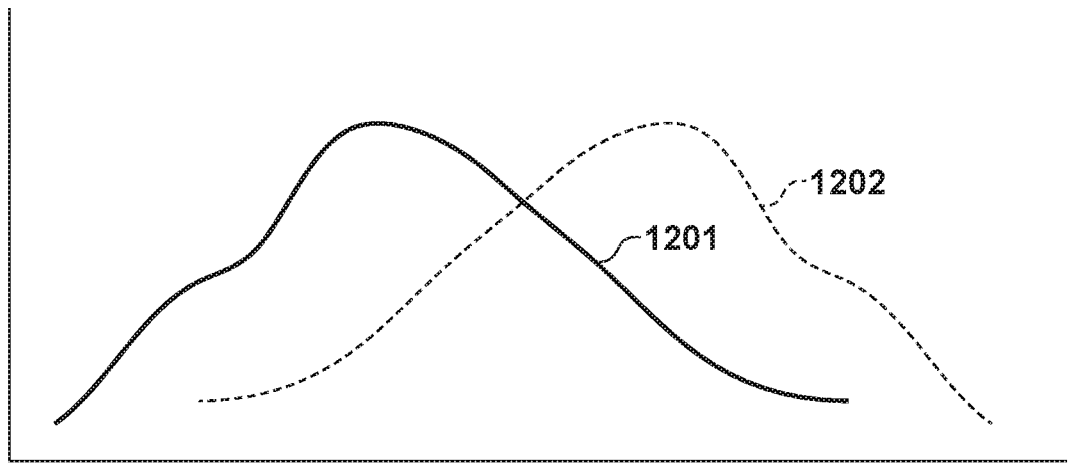

A second method is to determine the conversion amount depending on the maximum defocus amount and the rotation angle when the focusing lens 103 has been moved from the near end to the infinite end of the focus ring, and FIG. 11C shows a flowchart of setting processing in the second method. In step S401, the maximum defocus amount and the rotation angle of the focus ring are obtained. In step S402, a defocus amount per one degree of rotation angle of the focus ring is calculated. In step S403, the defocus amount that was obtained in step S402 is set as a defocus amount per one degree of the display part in focus assist display. In step S404, an in-focus position, and the angle of the display part position in the defocus amount of the second predetermined range, are calculated.

In step S405, it is determined whether or not the angle that was calculated in step S404 exceeds a maximum angle that has been set in advance for the index of focus assist display. When the angle exceeds the maximum angle for the index of focus assist display (Yes in step S405), a defocus amount per one degree is calculated based on the maximum angle of the index. Here, it is determined whether or not the maximum angle for the index of focus assist display is exceeded, and when determined that the maximum angle is exceeded, the defocus amount per one degree is increased. However, conversely, the second predetermined range may be set to a defocus amount calculated from the defocus amount per one degree of angle of the index that was calculated in step S403 and the maximum angle that has been set in advance for the index of focus assist display.

In step S108 in FIG. 4B, the defocus amount that was obtained in step S103 is converted to an index position, based on the defocus amount per one degree of the index that was obtained as described above.

The second embodiment was described as an interchangeable lens-type image capturing system, but similar control can also be performed in a fixed lens-type image capturing apparatus. In that case, it is not necessary to transmit lens information from the lens control unit 106 to the camera control unit 207.

According to this second embodiment as described above, in addition to similar effects as the first embodiment, by changing display properties of the index of focus assist display using lens information, it is possible to perform focus assist display that is suitable for operability of the focus ring. Thus, it is possible to improve user operability in the image capturing apparatus.

Third Embodiment

Next is a description of the third embodiment of the present invention. Note that in display control of focus assist display in the third embodiment, processing to calculate an index position in focus assist display in step S108 in FIG. 4B differs from the first and second embodiments. Accordingly, below, differing points will be described, but a description of configurations of the image capturing apparatus and display control that are the same as in the first and second embodiments will be omitted here.

In general, the depth of focus at the time of focusing on a subject located at a predetermined distance differs depending on the focal length. The depth of focus is deep when the focal length is in the wide angle side, and the depth of focus becomes narrower as the focal length approaches the telephoto end.

In step S104 in FIG. 4B, if the defocus amount is within the first predetermined range, it is determined that an in-focus state is attained, however, in a case where the depth of focus is deep, the range of distance where a subject located at a predetermined range of distance is in focus is wide, and a period of time when the first display format is maintained becomes long with respect to an amount of operation of a focus ring. As a result, it becomes difficult to focus on a point at which the subject located at a predetermined distance is most focused.

Accordingly, the first predetermined range is changed with respect to the focal length. More specifically, as the focal length is changed toward the telephoto end, the first predetermined range is widened. For example, in a case where the focal length is less than 50 mm, then the first predetermined range is set to ×0.7 of the depth of focus; in a case where the focal length is greater than or equal to 50 mm and less than 85 mm, then the first predetermined range is set to ×0.8 of the depth of focus; in a case where the focal length is greater than or equal to 85 mm and less than 135 mm, then the first predetermined range is set to ×0.9 of the depth of focus; and in a case where the focal length is greater than or equal to 135 mm, then the first predetermined range is set to ×1 of the depth of focus.

Accordingly, if the depth of focus changes depending on the focal length, it becomes easier to focus on a position where a subject is most focused, and by the virtue of this, the user operability of the image capturing apparatus improves.

Similarly, in a case where the depth of focus is deep, a moving amount of the index of the focus assist display becomes small with respect to an operation amount of the focus ring, and a user may feel uncomfortable when the focus assist display is in the second display format.

Accordingly, in the calculation processing of index position in the focus assist display in step S108 in FIG. 4B, the defocus amount per 1 degree of the index in the focus assist display is changed in accordance with the focal length. For example, in a case where the focal length is less than 50 mm, then the defocus amount per 1 degree of the index in the focus assist display in the third embodiment may be set to ×0.7 of the defocus amount per 1 degree of the index calculated in the first and second embodiments; set to ×0.8 of the defocus amount per 1 degree of the index in a case where the focal length is greater than or equal to 50 mm and less than 85 mm; set to ×0.9 of the defocus amount per 1 degree of the index in a case where the focal length is greater than or equal to 85 mm and less than 135 mm; and set to ×1 of the defocus amount per 1 degree of the index in a case where the focal length is greater than or equal to 135 mm.

According to the third embodiment as described above, in addition to the same effects as those of the first and second embodiments, it is possible to realize focus assist display conforming to operability of the focus ring by changing the display characteristics of the index of the focus assist display in response to the focal length. By virtue of the above, it is possible to improve a user operability of the image capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A display control apparatus, comprising:
   at least one processor; and
   at least one memory coupled to the at least one processor having instructions stored thereon which, when executed by the at least one processor, cause the display control apparatus to:
     perform focus detection to detect a focusing state based on an image signal generated by an image sensor; and
     perform display control to display in a display unit, when focus adjustment is performed by a manual operation, an index representing the focusing state,
   wherein the focusing state includes a defocus amount and a direction to an in-focus position,
   wherein the index includes a first index and a second index whose position spacing changes in accordance with the defocus amount, and a third index that indicates the in-focus position, and the first index and the second index are displayed so as to move by a movement amount corresponding to the defocus amount with respect to the third index, wherein, in the display control, a unit defocus amount corresponding to a preset movement amount of index is controlled to be smaller in a case where a detected defocus amount is a first amount than in a case where the detected defocus amount is a second amount which is larger than the first amount, and wherein the direction to the in-focus position is indicated by shapes of the first index and the second index, and the position spacing becomes 0 in a case where an in-focus state is detected.

2. The display control apparatus according to claim 1, wherein, in the display control, the unit defocus amount corresponding to the preset movement amount of index is controlled to be larger in a case of a first aperture value than in a case of a second aperture value which is on a full-open aperture side with respect to the first aperture value.

3. The display control apparatus according to claim 1, wherein, in the display control, the unit defocus amount corresponding to the preset movement amount of index is controlled to be larger in a case of a first illuminance than in a case of a second illuminance which is brighter than the first illuminance.

4. The display control apparatus according to claim 1, wherein, in the display control, the unit defocus amount corresponding to the preset movement amount of index is controlled to be larger in a case of a first focal length than in a case of a second focal length which is on a wide-angle side with respect to the first focal length.

5. The display control apparatus according to claim 1, wherein the unit defocus amount corresponding to the preset movement amount of index is determined based on a depth of focus.

6. The display control apparatus according to claim 1, wherein, in the display control, an average value of a predetermined number of defocus amounts which are obtained by a plurality of instances of detection, and the unit defocus amount corresponding to the preset movement amount of index is determined based on the average value.

7. The display control apparatus according to claim 6, wherein, in the display control, the predetermined number is changed according to at least one of the detected defocus amount, an aperture state, or an illuminance state.

8. The display control apparatus according to claim 1, wherein, in the display control, the movement amounts of the first index and the second index are calculated a plurality of times, and the position at which the index is displayed is determined based on an average value of a predetermined number of the movement amounts.

9. The display control apparatus according to claim 8, wherein, in the display control, the predetermined number is changed according to at least one of the detected defocus amount, an aperture state, or an illuminance state.

10. The display control apparatus according to claim 1, wherein the at least one memory further including instructions stored thereon which, when executed by the at least one processor, further cause the display control apparatus to perform acquisition processing of acquiring lens information, and wherein, in the display control, the unit defocus amount corresponding to the preset movement amount of index is changed based on the lens information.

11. The display control apparatus according to claim 10, wherein, in the display control, a maximum movement amount of index corresponding to each lens type is pre-stored, wherein the lens information includes the lens type.

12. The display control apparatus according to claim 11, wherein the lens information includes a maximum operation range of a member for manual operation of a focusing lens.

13. The display control apparatus according to claim 1, wherein the at least one memory further including instructions stored thereon which, when executed by the at least one processor, further cause the display control apparatus to perform setting processing of setting a defocus range in which a focusing lens is assumed to be in the in-focus position based on the detected defocus amount, and wherein, in the setting processing, the defocus range is changed according to a focal length.

14. The display control apparatus according to claim 13, wherein, in the setting processing, the defocus range is controlled to be wider in a case of a first focal length than in a case of a second focal length which is on a wide-angle side with respect to the first focal length.

15. The display control apparatus according to claim 13, wherein, in the setting processing, the defocus range is controlled further based on a depth of focus.

16. The display control apparatus according to claim 1, wherein the first index and the second index are moved by an angle, and the unit defocus amount corresponding to the preset movement amount of index is a defocus amount per 1 degree of the position spacing between the first index and the second index.

17. The display control apparatus according to claim 16, wherein the preset movement amount of index is an amount corresponding to a rotation angle of a focus ring at the time of performing focus adjustment by the manual operation.

18. An image capturing apparatus comprising:
an image sensor having a plurality of pixels provided with a plurality of photoelectric converters for a single microlens, the image sensor receiving luminous flux incident through an imaging optical system with the plurality of photoelectric converters and outputting a pair of image signals; and
a display control apparatus that comprises:
at least one processor; and
at least one memory coupled to the at least one processor having instructions stored thereon which, when executed by the at least one processor, cause the display control apparatus to:
perform focus detection to detect a focusing state based on an image signal generated by an image sensor; and
perform display control to display in a display unit, when focus adjustment is performed by a manual operation, an index representing the focusing state,
wherein the focusing state includes a defocus amount and a direction to an in-focus position,
wherein the index includes a first index and a second index whose position spacing changes in accordance with the defocus amount, and a third index that indicates the in-focus position, and the first index and the second index are displayed so as to move by a movement amount corresponding to the defocus amount with respect to the third index,
wherein, in the display control, a unit defocus amount corresponding to a preset movement amount of index is controlled to be smaller in a case where a detected defocus amount is a first amount than in a case where the detected defocus amount is a second amount which is larger than the first amount, wherein, in the focus detection, the focusing state is detected by performing phase-difference type focus detection based on the pair of image signals, and wherein the direction to the in-focus position is indicated by shapes of the first index and the second index, and the position spacing becomes 0 in a case where an in-focus state is detected.

19. A display control method, comprising:

performing focus detection to detect a focusing state based on an image signal obtainable from an image sensor; and performing display control to display in a display unit, when focus adjustment is performed by a manual operation, an index that indicates a detected defocus amount, wherein the focusing state includes a defocus amount and a direction to an in-focus position, wherein the index includes a first index and a second index whose position spacing changes in accordance with the defocus amount, and a third index that indicates the in-focus position, and the first index and the second index are displayed so as to move by a movement amount corresponding to the defocus amount with respect to the third index, wherein, in the display control, a unit defocus amount corresponding to a preset movement amount of index is controlled to be smaller in a case where a detected defocus amount is a first amount than in a case where the detected defocus amount is a second amount which is larger than the first amount, and wherein the direction to the in-focus position is indicated by shapes of the first index and the second index, and the position spacing becomes 0 in a case where an in-focus state is detected.

20. A non-transitory computer-readable storage medium storing a program for causing a computer to execute a display control method, comprising:

performing focus detection to detect a focusing state based on an image signal obtainable from an image sensor; and performing display control to display in a display unit, when focus adjustment is performed by a manual operation, an index that indicates a detected defocus amount, wherein the focusing state includes a defocus amount and a direction to an in-focus position, wherein the index includes a first index and a second index whose position spacing changes in accordance with the defocus amount, and a third index that indicates the in-focus position, and the first index and the second index are displayed so as to move by a movement amount corresponding to the defocus amount with respect to the third index, wherein, in the display control, a unit defocus amount corresponding to a preset movement amount of index is controlled to be smaller in a case where the detected defocus amount is a first amount than in a case where the detected defocus amount is a second amount which is larger than the first amount, and wherein the direction to the in-focus position is indicated by shapes of the first index and the second index, and the position spacing becomes 0 in a case where an in-focus state is detected.

21. A display control apparatus, comprising:

at least one processor; and at least one memory coupled to the at least one processor having instructions stored thereon which, when executed by the at least one processor, cause the display control apparatus to:

perform focus detection to detect a focusing state based on an image signal generated by an image sensor; and perform display control to display in a display unit, when focus adjustment is performed by a manual operation, an index representing the focusing state, wherein the focusing state includes a defocus amount and a direction to an in-focus position, wherein the index includes a first index and a second index whose position spacing changes in accordance with the defocus amount, and a third index that indicates the in-focus position, and the first index and the second index are displayed so as to move by a movement amount corresponding to the defocus amount with respect to the third index, wherein, in the display control, a unit defocus amount corresponding to a preset movement amount of index is controlled to be larger in a case where a detected defocus amount is a first amount than in a case where the detected defocus amount is a second amount which is smaller than the first amount, and wherein the direction to the in-focus position is indicated by shapes of the first index and the second index, and the position spacing becomes 0 in a case where an in-focus state is detected.

* * * * *